United States Patent [19]
Ou-Yang

[11] Patent Number: 6,015,603
[45] Date of Patent: Jan. 18, 2000

[54] IMAGING MEDIUM COMPRISING POLYVINYL CHLORIDE, METHOD OF IMAGING SAID MEDIUM, AND IMAGE-BEARING MEDIUM

[75] Inventor: David T. Ou-Yang, Woodbury, Minn.

[73] Assignee: 3M Innovative Properties Company, St. Paul, Minn.

[21] Appl. No.: 08/847,136

[22] Filed: Apr. 30, 1997

[51] Int. Cl.[7] .................................................... B32B 3/00
[52] U.S. Cl. ..................... 428/195; 428/355 R; 428/483; 428/508; 427/207.1; 430/119; 430/126
[58] Field of Search ................................ 428/195, 355 R, 428/483, 508; 430/126, 119; 427/207.1

[56] References Cited

U.S. PATENT DOCUMENTS

| | | | |
|---|---|---|---|
| Re. 24,906 | 12/1960 | Ulrich | 206/59 |
| 3,389,827 | 6/1968 | Abere et al. | 220/53 |
| 3,949,148 | 4/1976 | Akman | 428/500 |
| 4,080,348 | 3/1978 | Korpman | 260/27 BB |
| 4,136,071 | 1/1979 | Korpman | 260/27 BB |
| 4,181,752 | 1/1980 | Martens et al. | 427/54.1 |
| 4,286,039 | 8/1981 | Landa et al. | 430/119 |
| 4,684,238 | 8/1987 | Till et al. | 355/10 |
| 4,792,584 | 12/1988 | Shiraki et al. | 524/77 |
| 4,794,651 | 12/1988 | Landa et al. | 430/110 |
| 4,833,179 | 5/1989 | Young et al. | 522/183 |
| 4,952,650 | 8/1990 | Young et al. | 526/194 |
| 5,028,964 | 7/1991 | Landa et al. | 355/273 |
| 5,047,306 | 9/1991 | Almog | 430/115 |
| 5,089,856 | 2/1992 | Landa et al. | 355/279 |
| 5,192,638 | 3/1993 | Landa et al. | 430/137 |
| 5,196,246 | 3/1993 | Kauss et al. | 428/39 |
| 5,276,492 | 1/1994 | Landa et al. | 355/277 |
| 5,380,611 | 1/1995 | Landa | 430/45 |
| 5,410,392 | 4/1995 | Landa | 355/271 |
| 5,504,129 | 4/1996 | Dandreaux et al. | 524/270 |
| 5,545,459 | 8/1996 | Chang | 428/121 |

FOREIGN PATENT DOCUMENTS

| | | |
|---|---|---|
| 0 466 503 A1 | 1/1992 | European Pat. Off. . |
| 0 506 109 A1 | 9/1992 | European Pat. Off. ......... G03G 7/00 |
| 0 684 337 A2 | 11/1995 | European Pat. Off. . |
| 24 54 047 | 5/1975 | Germany . |

OTHER PUBLICATIONS

Brooks & Pirog, Processing of Surlyn® Ionomer Resins by Blown and Cast Film Processes, DuPont Company, Plastics Department, p. 18.

ASTM Standard "D–1238," "Standard Test Method for Flow Rates of Thermoplastics by Extrusion Plastometer.".

ASTM Test method Designation: D 4060–81, "Standard Test Method for Abrasion Resistance of Organic Coatings by the Taber Abraser," *1982 Annual Book of ASTM Standards*, Part 27, ASTM, Philadelphia, Pennsylvania, pp. 918–920.

XP002033594, JP 57 161 753 A, Abstract, Derwent Publications Ltd., Oct. 5, 1982.

*Primary Examiner*—William Krynski
*Assistant Examiner*—Hong J. Xu
*Attorney, Agent, or Firm*—Carolyn A. Bates

[57] ABSTRACT

A polymeric imaging medium comprising a receptor layer and a polyvinyl chloride backing layer particularly useful in electrophotographic printing processes with liquid toners comprising thermoplastic toner particles in a liquid carrier that is not a solvent for the particles at a first temperature and that is a solvent for the particles at a second temperature or with dry toner, methods of imaging such a medium, and such an imaged medium.

54 Claims, 3 Drawing Sheets

IMAGING MEDIUM COMPRISING POLYVINYL CHLORIDE, METHOD OF IMAGING SAID MEDIUM, AND IMAGE-BEARING MEDIUM

TECHNICAL FIELD

The present invention relates generally to an imaging medium. The present invention relates more particularly to an imaging medium comprising a particular receptor layer and a polyvinyl chloride backing layer particularly useful in electrophotographic printing processes with liquid toners comprising thermoplastic toner particles in a liquid carrier that is not a solvent for the particles at a first temperature and that is a solvent for the particles at a second temperature or with dry toner; methods of imaging such a medium; and such an imaged medium.

BACKGROUND OF THE INVENTION

Methods and apparatuses for electrophotographic printing are known. Electrophotographic printing generally includes imparting an image on a final receptor by forming a latent image on selectively charged areas of a photoconducter such as a charged drum, depositing a charged toner onto the charged areas of the photoconductor to thereby develop an image on the photoconductor, and transferring the developed toner from the charged drum under heat and/or pressure onto the final receptor. An optional transfer member can be located between the photoconductor and the final receptor. Examples of electrophotographic apparatuses and methods are disclosed in U.S. Pat. Nos. 5,276,492; 5,380,611; and 5,410,392. The '492 and '392 patents both disclose that a preferred toner is a liquid toner comprising carrier liquid and pigmented polymeric toner particles which are essentially non-soluble in the carrier liquid at room temperature, and which solvate in the carrier liquid at elevated temperatures. Examples of such liquid toners are disclosed in U.S. Pat. No. 4,794,651. The '492 patent and the '392 patent both disclose that the toner image can be transferred to a receiving substrate such as paper ('492 patent: column 7, lines 19–20; '392 patent: column 4, lines 57–58). While having their own utility, paper substrates are not desired for all applications and uses. The '611 patent discloses that the toner image can be transferred to a receiving substrate such as a transparency, without disclosing any particular composition of a transparency (column 4, lines 17).

It is also known that certain polymeric and ionomeric compositions are suitable for use with some printing methods and apparatuses. For example, flexographic printing on films made from SURLYN brand ionomeric resin, available from E.I. du Pont de Nemours & Company, Wilmington, Del. has been suggested. See Brooks & Pirog, *Processing of Surlyn® Ionomer Resins by Blown and Cast Film Processes*, p. 18, Du Pont Company, Plastics Department, Polyolefins Division, Technical Services Laboratory. U.S. Pat. No. 5,196,246 discloses a wall decorating system that, in one embodiment, includes a SURLYN blend film that can be printed by etching, embossing, flexographic printing, silk screening, or gravure processes (column 14, lines 16–19).

Conventional printing processes include flexographic, gravure, and screen printing. These processes require a long time to make printing patterns, such as printing plates or gravure cylinders. Furthermore, the printing equipment needed for such processes is rather expensive. Such printing processes are not practical for short run print-on-demand type printing.

Polyvinyl chloride films are widely used in the printing industries especially in the areas of labels, graphic arts and data cards. Desirable features of polyvinyl chloride include its clarity, low cost, conformability and wide range of compoundability.

Short run, print-on-demand type printing is becoming increasingly popular. Printers capable of providing such short run print on demand printing include those developed by Indigo Ltd. and those developed by Xeikon N. V. The Indigo printers can employ electrophotographic liquid toner whereas the Xeikon printers employ dry toner.

Commercially available polyvinyl chloride films which are untreated cannot be printed with an Indigo printer. A special solvent based polyamide coating (such as that available from Indigo Ltd. under the name Topaz) is usually required in order to yield acceptable printing with the Indigo printer. However, the image printed over such a coating typically exhibits poor Taber abrasion resistance (i.e., below 6).

Commercially available polyvinyl chloride films can be readily printed with a Xeikon printer. However, the resultant images demonstrate inadequate Taber abrasion resistance (i.e. below 6).

SUMMARY OF THE INVENTION

What is desired is an imaging medium comprising polyvinyl chloride that can readily be printed by short run electrophotographic methods and apparatuses to produce high quality images and that is strong, durable, and abrasion-resistant.

We have discovered such an imaging medium. The present invention provides imaging media comprising a particular receptor layer and a polyvinyl chloride backing layer. The imaging media of the present invention are particularly useful in electrophotographic printing processes with liquid toners comprising thermoplastic toner particles in a liquid carrier that is not a solvent for the particles at a first temperature and that is a solvent for the particles at a second temperature. The imaging media of the present invention are also particularly useful in electrophotographic printing processes employing dry toner (such as dry powder toner). The present invention also provides methods of imaging such imaging media, and such an imaged media.

One advantage of the present invention is that upon extruding a receptor layer (or a portion of a receptor layer) on a polyvinyl chloride backing, it is not necessary to heat the resulting structure or subject it to irradiation (such as ultraviolet light radiation). Thus the formation of such imaging medium can take place in the substantial or complete absence of ultraviolet light radiation. The term "in the substantial absence of ultraviolet radiation" as used herein means that an artificial source of ultraviolet radiation such as a UV generating lamp is not present. Very minor amounts of ultraviolet radiation may be present due to standard room lighting (such as fluorescent or incandescent lighting) or natural lighting. However, these amounts are insubstantial and would be less than about $10^{-1}$ watts/inch ($4 \times 10^{-4}$ watts/cm). Thus, bondings, etc. occurring in natural or standard room lighting would thus be considered to be in the substantial absence of ultraviolet radiation.

A first embodiment of the imaging medium of the invention is an imaging medium comprising:

(a) a receptor layer, wherein the receptor layer comprises a blend of about 5 to about 65 percent by weight first polymer(s) and about 35 to about 95 percent by weight of a second polymer(s), wherein the weight percentages of the first polymer(s) and the second polymer(s) are based upon the total weight of the receptor layer, wherein each first polymer independently comprises the polymerization product of a composition comprising (i) ethylene, (ii) monomer(s) selected from the group consisting of vinyl acetate, vinyl acrylate, vinyl carboxylic acid(s) and mixtures thereof, and (iii) optionally an anhydride(s), and each second polymer independently comprises the polymerization product of a composition comprising (i) ethylene, (ii) monomer(s) selected from the group consisting of vinyl acetate, vinyl acrylate, and mixtures thereof, and (iii) carbon monoxide, wherein the receptor layer has a melt index of at least about 2.5 grams/10 minutes; and (b) a polyvinyl chloride backing layer bonded to the receptor layer;

wherein the composition of the receptor layer is selected such that the T-peel adhesion of the receptor layer to the polyvinyl chloride backing layer is at least about 358 g/cm, and such that at least one of the following is true:

(i) the Taber abrasion resistance test value for an image electrophotographically formed on the receptor layer with a liquid toner is at least about 6;

(ii) the Taber abrasion resistance test value for an image electrophotographically formed on the receptor layer with a dry toner is at least about 6.

A second embodiment of the imaging medium of the invention is an imaging medium comprising:

(a) a receptor layer, wherein the receptor layer comprises a laminate comprising (I) a first layer comprising a first polymer(s), wherein the first layer comprises at least about 10 percent by weight first polymer(s) based upon the total weight of the first layer and (II) a second layer comprising a second polymer(s), wherein the second layer comprises at least about 35 percent second polymer(s) based upon the total weight of the second layer, wherein each first polymer independently comprises the polymerization product of a composition comprising (i) ethylene, (ii) monomer(s) selected from the group consisting of vinyl acetate, vinyl acrylate, vinyl carboxylic acids and mixtures thereof, and (iii) optionally an anhydride(s), and each second polymer independently comprises the polymerization product of a composition comprising (i) ethylene, (ii) monomer(s) selected from the group consisting of vinyl acetate, vinyl acrylate, and mixtures thereof, and (iii) carbon monoxide, and wherein the receptor layer has a melt index of at least about 2.5 grams/10 minutes; and (b) a polyvinyl chloride backing layer bonded to the receptor layer such that the second layer of the receptor layer is closest to the polyvinyl chloride backing layer;

wherein the composition of the receptor layer is selected such that the T-peel adhesion of the receptor layer to the polyvinyl chloride backing layer is at least about 358 g/cm, and such that at least one of the following is true:

(i) the Taber abrasion resistance test value for an image electrophotographically formed on the receptor layer with a liquid toner is at least about 6;

(ii) the Taber abrasion resistance test value for an image electrophotographically formed on the receptor layer with a dry toner is at least about 6. Preferably the first layer comprises at least about 75 percent by weight first polymer(s) based upon the total weight of the first layer and wherein the second layer comprises at least about 60 percent second polymer based on the total weight of the second layer. The present invention provides a method comprising a step of using the imaging medium of the present invention in an electrophotographic printing process.

An image may be formed from a dry thermoplastic toner or from a composition comprising a plurality of thermoplastic toner particles in a liquid carrier at a first temperature, wherein the liquid carrier is not a solvent for the particles at the first temperature and wherein the thermoplastic particles and the liquid carrier form substantially a single phase at or above a second temperature.

The present invention also provides a method of transferring an electrophotographically developed image from a photoconductor to an imaging medium wherein the toner employed is a liquid toner. The method comprises the steps of: a) selectively providing desired portions of a photoconductor with a developed image, the image comprising a plurality of thermoplastic toner particles in a liquid carrier at a first temperature, wherein the liquid carrier is not a solvent for the particles at the first temperature and wherein the thermoplastic particles and the liquid carrier form substantially a single phase at or above a second temperature; b) heating the developed image to a temperature at least as high as the second temperature to thereby form a single phase of the thermoplastic particles and liquid carrier; and c) thereafter transferring the developed image to the receptor layer of the imaging medium of the invention at a temperature of about 120 to about 165° C.

The present invention also provides a method of transferring an electrophotographically developed image from a photoconductor to an imaging medium, comprising the steps of:

a) selectively providing desired portions of a photoconductor with a developed image, the image comprising a plurality of thermoplastic dry toner particles wherein the toner particles are solid at a first temperature, but which soften or melt at or above a second temperature;

b) transferring the developed image onto a receptor layer of an imaging medium of the present invention;

c) heating and optionally applying pressure to the developed image such that it reaches a temperature at least as high as the second temperature to soften or melt the toner particles to form a final fixed image.

The present invention also provides an imaged article. The imaged article comprises a receptor layer having an imaging surface (also referred to as an "imageable surface"), and an image on the imaging surface, the image typically comprising a substantially continuous layer. In one embodiment the layer of the image comprises the thermoplastic and a liquid carrier that is not a solvent for the particles at a first temperature and which is a solvent for the particles at or above a second temperature, the layer having been deposited onto the imaging surface while in substantially a single phase with a liquid carrier. The resultant image is at least 95% free, preferably at least 98% free, more preferably at least 99% free and most preferably 100% free of solvent. In another embodiment the layer of the image is formed from dry toner particles.

An embodiment of the imaged medium of the invention is an imaged medium comprising:

(a) the imaging medium of the invention;

(b) an image on a surface of the receptor layer of the imaging medium which surface is not bonded to the backing, wherein the image is formed from a composition comprising a plurality of thermoplastic toner particles in a liquid carrier at a first temperature, wherein the liquid carrier is not a solvent for the particles at the first temperature and wherein the thermoplastic particles and the liquid carrier form substantially a single phase at or above a second temperature.

Another embodiment of the imaged medium of the invention is an imaged medium comprising:

(a) the imaging medium of the invention;

(b) an image on a surface of the receptor layer of the imaging medium, which surface is not bonded to the backing, wherein the image is formed from a dry thermoplastic toner.

Definitions

Certain terms are used in the description and the claims that, while for the most part are well known, may require some explanation. It should be understood that the term "electrophotographic printing" refers to printing processes in which an image is imparted on a receptor by forming a latent image on selectively charged areas of a photoconducter such as a charged drum, depositing a charged toner onto the charged areas of the photoconductor to thereby develop an image on the photoconductor, and transferring the developed toner from the charged drum under heat and/or pressure onto an imaging medium. An optional transfer member can be located between the charged drum and the imaging medium. Examples of electrophotographic printing apparatuses are well known in the art and include, but are not limited to, the OMNIUS and E-1000 electrophotographic printers, available from Indigo, Ltd. of Rehovot, Israel; the DCP-1 printer available from Xeikon N.V. of Mortsel, Belgium; and the LANIER 6345 copier available from Lanier Worldwide, Inc. of Atlanta, Ga.

All parts, percentages, ratios, etc. herein are by weight unless indicated otherwise.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

The present invention provides imaging media comprising a particular receptor layer and a polyvinyl chloride ("PVC") backing layer. The imaging media of the present invention are particularly useful in electrophotographic printing processes with liquid toners comprising thermoplastic toner particles in a liquid carrier that is not a solvent for the particles at a first temperature and that is a solvent for the particles at a second temperature. The imaging media is also useful in electrophotographic printing processes with dry toner. The present invention also provides methods of imaging such imaging media, and such an imaged media.

IMAGING MEDIUM

Figure 1A:
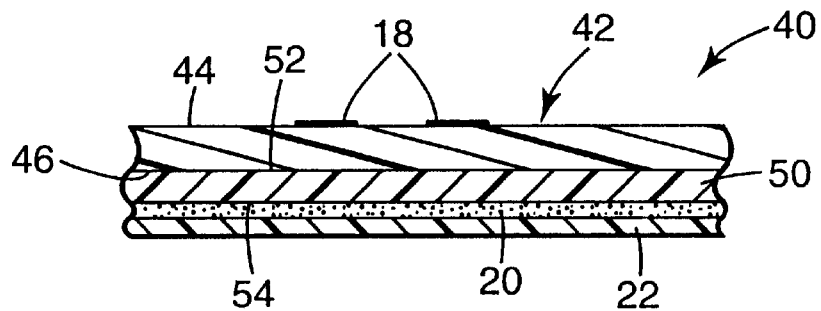
FIG. 1a is a cross-sectional view of a first embodiment of an imaging medium according to the present invention.

Referring now to FIG. 1a, there is illustrated a first preferred embodiment of imaging medium 40. This embodiment includes receptor layer 42 joined to polyvinyl chloride backing layer 50. Receptor layer 42 includes first major surface, or image surface 44, and second major surface, or back surface 46. Backing layer 50 includes first major surface 52 joined to the second surface 46 of the receptor layer. Backing layer also includes second major surface 54 opposite the first major surface 52. Optional layer of adhesive 20 may be provided on the second major surface 54 of the backing layer. When the adhesive layer is a pressure sensitive adhesive, then it is preferable to provide release liner 22 as is well known in the art. Direct printed image 18 has been printed on imaging surface 44 as is discussed in detail below.

The receptor layer 42 preferably comprises a first polymer (s) obtained by polymerizing ethylene with one or more monomers selected from the group consisting of vinyl acetate, esters of alkyl acrylic acid, esters of alkacrylic acid, vinyl acrylic acid, vinyl alkyl acrylic acid, and mixtures thereof blended with a second polymer(s) described in detail later herein. Thus in receptor layer 42 the first polymer and second polymer are in the form of a blend.

Figure 1B:
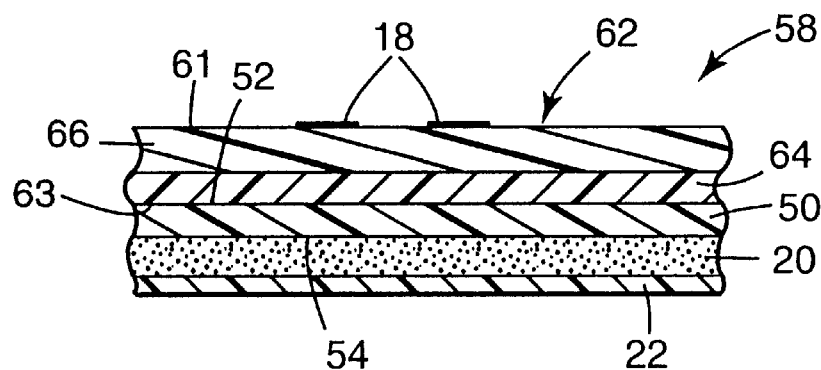
FIG. 1b is a cross-sectional view of a second embodiment of an imaging medium according to the present invention.

Referring now to FIG. 1b, there is illustrated a second preferred embodiment of imaging medium 58. This embodiment includes receptor layer 62 joined to polyvinyl chloride backing layer 50. Receptor layer 62 includes first major surface, or image surface 61, and second major surface, or back surface 63. Backing layer 50 includes first major surface 52 joined to the second surface 63 of the receptor layer. Backing layer also includes second major surface 54 opposite the first major surface 52. Optional layer of adhesive 20 may be provided on the second major surface 54 of the backing layer. When the adhesive layer is a pressure sensitive adhesive, then it is preferable to provide release liner 22 as is well known in the art. Direct printed image 18 has been printed on imaging surface 61 as is discussed in detail below.

Receptor layer 62 comprises two separate layers 66 and 64 which are bonded and adhered together (such as by laminating). Layer 66 comprises the first polymer(s). Layer 64 comprises the second polymer(s).

Figure 1C:
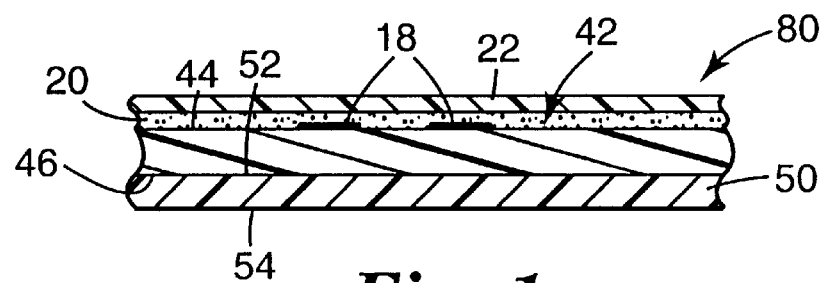
FIG. 1c is a cross-sectional view of a third embodiment of an imaging medium according to the present invention.

Referring now to FIG. 1c, there is illustrated a first preferred embodiment of imaging medium 80. This embodiment includes receptor layer 42 joined to polyvinyl chloride backing layer 50. Receptor layer 42 includes first major surface, or image surface 44, and second major surface, or back surface 46. Backing layer 50 includes first major surface 52 joined to the second surface 46 of the receptor layer. Backing layer also includes second major surface 54 opposite the first major surface 52. Optional layer of adhesive 20 may be provided on the first major surface 44 of the receptor layer 42 over reverse printed image 18. When the adhesive layer is a pressure sensitive adhesive, then it is preferable to provide release liner 22 thereover. Reverse printed image 18 has been printed on imaging surface 44.

The receptor layer 42 preferably comprises a first polymer (s) obtained by polymerizing ethylene with one or more monomers selected from the group consisting of vinyl acetate, esters of alkyl acrylic acid, esters of alkacrylic acid, vinyl acrylic acid, vinyl alkyl acrylic acid, and mixtures thereof blended with a second polymer(s) described in detail later herein. Thus in receptor layer 42 the first polymer and second polymer are in the form of a blend.

The backing layer 50 should be translucent, transparent or a combination thereof and the receptor layer 42 should be translucent, transparent or a combination thereof to allow viewing of the image therethrough. Most preferably, both the backing layer 50 and receptor layer 42 are transparent.

Figure 1D:
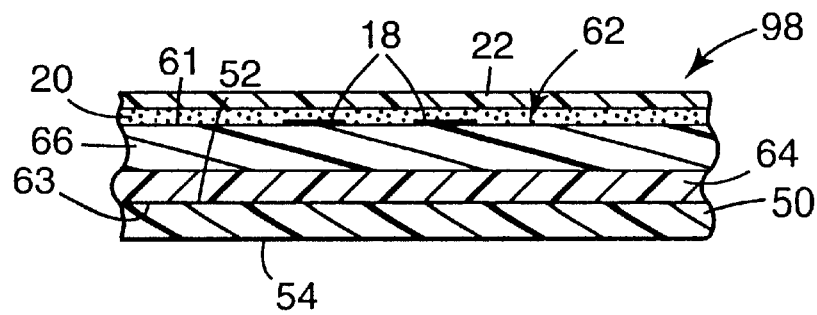
FIG. 1d is a cross-sectional view of a fourth embodiment of an imaging medium according to the present invention.

Referring now to FIG. 1d, there is illustrated a fourth preferred embodiment of imaging medium 98. This embodiment includes receptor layer 62 joined to polyvinyl chloride backing layer 50. Receptor layer 62 includes first major surface, or image surface 61, and second major surface, or back surface 63. Backing layer 50 includes first major surface 52 joined to the second surface 63 of the receptor layer. Backing layer also includes second major surface 54 opposite the first major surface 52. Optional layer of adhesive 20 may be provided on the first major surface 61 of the receptor layer 62. When the adhesive layer is a pressure sensitive adhesive, then it is preferable to provide release liner 22 thereover. Reverse printed image 18 has been printed on imaging surface 61. The backing layer 50 should be transparent, translucent or a combination thereof and the receptor layer 62 should be transparent, translucent or a combination thereof to allow viewing of the image therethrough. Most preferably, both the backing layer 50 and receptor layer are transparent. As mentioned above, the imaged medium of the invention further comprises a layer of adhesive coated over a surface of the backing opposite the receptor layer and a release liner attached to a surface of the adhesive layer opposite the backing.

Alternatively, the imaged medium of the invention may further comprise a layer of adhesive coated over the image and the surface of the receptor layer not bonded to the backing, wherein the receptor layer and backing are selected such that the image can be viewed therethrough. For example, the receptor layer and backing may each independently be transparent, translucent, or a combination thereof.

Melt Index

Receptor layer materials useful in the present invention preferably have a melt index (MI) of at least about 2.5 grams/10 minutes, preferably ranging from about 3.0 to about 45 grams/10 minutes. Melt index is determined by following the procedures set forth in ASTM Standard "D-1238", "Standard Test Method for Flow Rates of Thermoplastics by Extrusion Plastometer", incorporated by reference herein, at 190° C.; 2.16 kg. Percent compositions set forth herein are percent by weight, unless otherwise specified.

First Polymer(s)

Preferably the first polymer(s) are selected from the group consisting of:

ethylene/vinyl carboxylic acid copolymers, each ethylene/vinyl carboxylic acid copolymer independently comprising about 75 to about 99 percent by weight ethylene and about 1 to about 25 weight percent vinyl carboxylic acid, based upon the total weight of the ethylene/vinyl carboxylic acid copolymer;

ethylene/vinyl acetate copolymers, each ethylene/vinyl acetate copolymer independently comprising about 52 to about 85 percent by weight ethylene and about 15 to about 48 weight percent vinyl acetate, based upon the total weight of the ethylene/vinyl acetate copolymer;

ethylene/vinyl acrylate copolymers, each ethylene/vinyl acrylate copolymer independently comprising about 60 to about 90 percent by weight ethylene and about 10 to about 40 weight percent vinyl acrylate, based upon the total weight of the ethylene/vinyl acrylate copolymer;

ethylene/vinyl carboxylic acid/vinyl acetate copolymers, each ethylene/vinyl carboxylic acid/vinyl acetate copolymer independently comprising about 37 to about 89 percent by weight ethylene, about 1 to about 15 weight percent vinyl carboxylic acid, and about 10 to about 48 percent by weight vinyl acetate based upon the total weight of the ethylene/vinyl carboxylic acid/vinyl acetate copolymer;

ethylene/vinyl carboxylic acid/vinyl acrylate copolymers, each ethylene/vinyl carboxylic acid/vinyl acrylate copolymer independently comprising about 45 to about 89 percent by weight ethylene, about 1 to about 15 weight percent vinyl carboxylic acid, and about 10 to about 40 percent by weight vinyl acrylate based upon the total weight of the ethylene/vinyl carboxylic acid/vinyl acrylate copolymer;

ethylene/anhydride/vinyl acetate copolymers, each ethylene/anhydride/vinyl acetate copolymer independently comprising about 37 to about 89.9 percent by weight ethylene, about 0.1 to about 15 weight percent anhydride, and about 10 to about 48 percent by weight vinyl acetate based upon the total weight of the ethylene/anhydride/vinyl acetate copolymer;

ethylene/anhydride/vinyl acrylate copolymers, each ethylene/anhydride/vinyl acrylate copolymer independently comprising about 45 to about 94.9 percent by weight ethylene, about 0.1 to about 15 weight percent anhydride, and about 5 to about 40 percent by weight vinyl acrylate based upon the total weight of the ethylene/anhydride/vinyl acrylate copolymer; and mixtures thereof More preferably the first polymer(s) are selected from the group consisting of:

ethylene/vinyl carboxylic acid copolymers, each ethylene/vinyl carboxylic acid copolymer independently comprising about 80 to about 98 percent by weight ethylene and about 2 to about 20 weight percent vinyl carboxylic acid, based upon the total weight of the ethylene/vinyl carboxylic acid copolymer;

ethylene/vinyl acetate copolymers, each ethylene/vinyl acetate copolymer independently comprising about 60 to about 85 percent by weight ethylene and about 15 to about 40 weight percent vinyl acetate, based upon the total weight of the ethylene/vinyl acetate copolymer;

ethylene/vinyl acrylate copolymers, each ethylene/vinyl acrylate copolymer independently comprising about 70 to about 90 percent by weight ethylene and about 10 to about 30 weight percent vinyl acrylate, based upon the total weight of the ethylene/vinyl acrylate copolymer;

ethylene/vinyl carboxylic acid/vinyl acetate copolymers, each ethylene/vinyl carboxylic acid/vinyl acetate copolymer independently comprising about 48 to about 84 percent by weight ethylene, about 1 to about 12 weight percent vinyl carboxylic acid, and about 15 to about 40 percent by weight vinyl acetate based upon the total weight of the ethylene/vinyl carboxylic acid/vinyl acetate copolymer;

ethylene/vinyl carboxylic acid/vinyl acrylate copolymers, each ethylene/vinyl carboxylic acid/vinyl acrylate copolymer independently comprising about 52 to about 89 percent by weight ethylene, about 1 to about 12 weight percent vinyl carboxylic acid, and about 10 to about 30 percent by weight vinyl acrylate based upon the total weight of the ethylene/vinyl carboxylic acid/vinyl acrylate copolymer;

ethylene/anhydride/vinyl acetate copolymers, each ethylene/anhydride/vinyl acetate copolymer independently comprising about 42 to about 84.9 percent by weight ethylene, about 0.1 to about 12 weight percent anhydride, and about 15 to about 40 percent by weight vinyl acetate based upon the total weight of the ethylene/anhydride/vinyl acetate copolymer;

ethylene/anhydride/vinyl acrylate copolymers, each ethylene/anhydride/vinyl acrylate copolymer independently comprising about 52 to about 89.9 percent by weight ethylene, about 0.1 to about 12 weight percent anhydride, and about 10 to about 30 percent by weight vinyl acrylate based upon the total weight of the ethylene/anhydride/vinyl acrylate copolymer; and mixtures thereof Most preferably the first polymer(s) are selected from the group consisting of:

ethylene/vinyl carboxylic acid copolymers, each ethylene/vinyl carboxylic acid copolymer independently comprising about 85 to about 96 percent by weight ethylene and about 4 to about 15 weight percent vinyl carboxylic acid, based upon the total weight of the ethylene/vinyl carboxylic acid copolymer;

ethylene/vinyl acetate copolymers, each ethylene/vinyl acetate copolymer independently comprising about 65 to about 82 percent by weight ethylene and about 18 to about 35 weight percent vinyl acetate, based upon the total weight of the ethylene/vinyl acetate copolymer;

ethylene/vinyl acrylate copolymers, each ethylene/vinyl acrylate copolymer independently comprising about 75 to about 85 percent by weight ethylene and about 15 to about 25 percent by weight vinyl acrylate, based upon the total weight of the ethylene/vinyl acrylate copolymer;

ethylene/vinyl carboxylic acid/vinyl acetate copolymers, each ethylene/vinyl carboxylic acid/vinyl acetate copolymer independently comprising about 55 to about 81 percent by weight ethylene, about 1 to about 10 weight percent vinyl carboxylic acid, and about 18 to about 35 percent by weight vinyl acetate based upon the total weight of the ethylene/vinyl carboxylic acid/vinyl acetate copolymer;

ethylene/vinyl carboxylic acid/vinyl acrylate copolymers, each ethylene/vinyl carboxylic acid/vinyl acrylate copolymer independently comprising about 65 to about 83 percent by weight ethylene, about 2 to about 10 weight percent vinyl carboxylic acid, and about 15 to about 25 percent by weight vinyl acrylate based upon the total weight of the ethylene/vinyl carboxylic acid/vinyl acrylate copolymer;

ethylene/anhydride/vinyl acetate copolymers, each ethylene/anhydride/vinyl acetate copolymer independently comprising about 55 to about 81.5 percent by weight ethylene, about 0.5 to about 10 weight percent anhydride, and about 18 to about 35 percent by weight vinyl acetate based upon the total weight of the ethylene/anhydride/vinyl acetate copolymer;

ethylene/anhydride/vinyl acrylate copolymers, each ethylene/anhydride/vinyl acrylate copolymer independently comprising about 65 to about 84 percent by weight ethylene, about 1 to about 10 weight percent anhydride, and about 15 to about 25 percent by weight vinyl acrylate based upon the total weight of the ethylene/anhydride/vinyl acrylate copolymer; and mixtures thereof Optionally, the first polymer(s) which make up the receptor layer may be modified by the incorporation of anhydrides (e.g., maleic anhydride) or vinyl carboxylic acid (e.g., methacrylic acid), acrylic acid, mixtures thereof, etc., into the polymer. For example, the previously mentioned polymerization product may be neutralized with a metal cation thereby forming an ionomer, having a neutralized acid content of from about 2 to about 6% by weight and an acid content of no more than about 15% by weight based upon the total weight of the first polymer(s). The ionomer may comprise, for example, a neutralized ethylene-co-methacrylic acid ionomer. For example, the first polymer(s) may comprise methacrylic acid in an amount of at least about 1.0% by weight based upon the total weight of the first polymer(s). As another example, the first polymer(s) may comprise an anhydride in an amount of at least about 0.1% by weight based upon the total weight of the first polymer(s). As another example, the first polymer(s) may comprise methacrylic acid in an amount of at least about 2% by weight based upon the total weight of the first polymer(s). As another example, the first polymer(s) may comprise the polymerization product of a composition comprising ethylene and an acid selected from the group consisting of methacrylic acid and acrylic acid, having a melt index of at least about 2.5 grams/10 minutes and an acid content of from about 2 to about 20% by weight based upon the total weight of the first polymer(s). Optionally, those first polymer(s) modified with acid may be partially neutralized by the addition of a metal cation, thus forming ionomers. Alternatively, blends of first polymer(s) may be formed and used by mixing together two or more of the above first polymers. Additionally, one or more of these first polymers or blends may be further blended with low density (0.910 g/cc) (or below) polyethylene (LDPE) or linear low density polyethylene (LLDPE). LLDPE's are commonly made by low pressure polymerization carried out at pressures in the range of about 7 to 20 bar in the gas phase in a fluid bed reactor or in the liquid phase. In low pressure polymerization, ethylene units polymerize in a linear fashion, whereby short branches or side chains can be built into the structure at intervals by copolymerizing with small amounts of α-olefins such as propylene, butene, octene, or hexene. The density of the polymer is controlled by the frequency of the side chains.

In one preferred embodiment, the first polymer(s) comprises an ethylene vinyl acetate ("EVA") copolymer. (It may, for example, comprise two monomers, three monomers, etc.). Typically the EVA(s) has a vinyl acetate ("VA") content of at least about 15% by weight, preferably about 15% to about 40% by weight, and more preferably about 18% to about 35% by weight based upon the total weight of the first polymer(s) and a melt index of at least about 2.5 grams/10 minutes. One example of a preferred EVA copolymer is ELVAX 3175 commercially available from E.I. du Pont de Nemours & Company, Wilmington, DE ("du Pont") and has a melt index of approximately 6.0 grams/10 minutes and a vinyl acetate content of about 28%. If the receptor layer comprises an EVA modified with acid, for example methacrylic acid, it typically comprises at least about 1 percent by weight acid, preferably about 1 to about 12% by weight acid. As a specific example, the first polymer(s) may comprise the polymerization product of a composition comprising ethylene, vinyl acetate, and methacrylic acid, the first polymer(s) having a melt index of at least about 2.5 grams/10 minutes, wherein the vinyl acetate content is about 15 to about 40 percent by weight and the acid content is about 1 to about 12 percent by weight based upon the total weight of the first polymer(s). One example of such a terpolymer is ELVAX 4260 commercially available from du Pont which has a melt index of approximately 6.0 grams/10 minutes, a vinyl acetate content of approximately 28%, and a methacrylic acid content of approximately 1.0%. If the first polymer comprises an EVA modified with anhydride, it preferably comprises at least about 0.1% anhydride, such as maleic anhydride. One example of such a terpolymer is "MODIC E-300-K" available commercially from Mitsubishi Petroleum Co., Ltd. of Japan. Polymers having a vinyl acetate content below about 15% by weight tend to have poor printability characteristics; and polymers having a vinyl acetate content above about 35% by weight tend to be sticky and less practical to use in the extrusion and printing processes.

In another preferred embodiment, the first polymer comprises an ethylene/vinyl acrylate copolymer, the vinyl acrylatel comprising, for example, vinyl alkyl acrylates such as vinyl methyl acrylate, vinyl ethyl acrylate, vinyl propyl acrylate, vinyl n-butyl acrylate, vinyl n-pentyl acrylate, vinyl n-hexyl acrylate, and other acrylates such as vinyl alkacrylates such as vinyl methacrylate, vinyl ethacrylate, vinyl propacrylate, vinyl butacrylate, vinyl pentacrylate, vinyl hexacrylate, and mixtures thereof In a preferred embodiment the first polymer comprises a polymer of ethylene acrylate, having a melt index of at least about 2.5 grams/10 minutes and an acrylate content of from about 10 to about 30% by weight, based upon the total weight of the first polymer(s).

If the first polymer(s) comprises an ethylene/vinyl acrylate terpolymer having acid, for example methacrylic acid incorporated therein, it comprises at least about 1% acid, preferably about 1 to about 12 percent by weight acid, based upon the total weight of the first polymer(s). As a specific example, the first polymer(s) may comprise the polymerization product of a composition comprising ethylene, vinyl acrylate, and methacrylic acid, the first polymer(s) having a melt index of at least about 2.5 grams/10 minutes, wherein the vinyl acrylate content is about 10 to about 30 percent by weight and the acid content is about 1 to about 12 percent by weight based upon the total weight of the first polymer(s). One example of such a terpolymer is "BYNEL CXA 2002" from du Pont, a terpolymer comprising ethylene, n-butylacrylate, and methacrylic acid having a melt index of approximately 10.0 grams/10 minutes, a methacrylic acid content of about 10%, and an n-butylacrylate content of about 10%, based upon the total weight of the first polymer (s). If the first polymer(s) comprises an ethylene vinyl acrylate anhydride terpolymer, it preferably comprises at least about 0.1% anhydride, such as maleic anhydride, based upon the total weight of the first polymer(s). The acrylate content is preferably about 10 to about 30%, based upon the total weight of the first polymer(s).

In another preferred embodiment, the first polymer comprises an ethylene/acid copolymer, the acid preferably comprising methacrylic acid or other vinyl carboxylic acid in an amount of about 2 to 20% by weight based upon the total weight of the copolymer and a melt index of at least about 2.5 grams/10 minutes. Polymers having a lower acid content may not have sufficient abrasion resistance. Polymers having a higher acid content may damage processing equipment over extended periods of time. An example of such an ethylene/acid copolymer is NUCREL 1207 available from du Pont, having a melt index of about 7.0 g/10 minutes and a methacrylic acid content of about 12.0%.

In another preferred embodiment, the first polymer comprises an ethylene acid copolymer that has been partially neutralized with a metal cation, thereby forming an ionomer. The salt content is preferably be greater than about 1% by weight, and preferably ranges from about 2 to about 6% by weight, with preferably no more than 15% leftover acid. Preferred examples of ionomers include copolymers of ethylene with acrylic acid or methacrylic acid, neutralized with a metal cation such as zinc, sodium, potassium, or magnesium. Particularly preferred ionomeric polymers are copolymers of ethylene with methacrylic acid. E.I. Du Pont de Nemours Co. produces a line of neutralized ethylene-co-methacrylic acid ionomeric polymers under the trade designation "SURLYN" that are acceptable for the present use, provided that the selected resin has the requisite melt index. A particularly preferred ionomeric resin is commercially available under the trade designation "SURLYN 1705", which has a melt index of 5.5 grams/10 minutes which is neutralized with zinc cation, is about 3% acid neutralized, and has about 12% acid content.

In one preferred embodiment, the first polymer component of the receptor layer 42, 62 comprises a blend of any one of the above first polymers in an amount of about 60 to about 90% with any other of the first polymers in an amount of about 10 to about 40% based upon the total weight of the first polymer component. In yet another preferred embodiment, the receptor layer comprises a blend of any one of the above first polymers with up to about 40% LDPE or LLDPE.

A specific example of a first polymer blend is a blend of one first polymer and another first polymer, wherein the one first polymer comprises a polymer of ethylene, n-butylacrylate, and methacrylic acid having a melt index of at least about 2.5 grams/10 minutes; and wherein the other first polymer comprises a neutralized ethylene-co-methacrylic acid ionomer. The first polymer component of the receptor layer preferably comprises a blend of the one first polymer in an amount of from about 60 to about 90% by weight and the other first polymer in an amount of from about 10 to about 30% by weight, based upon the total weight of the first polymer component.

Second Polymer

The second polymer comprises a copolymer of ethylene, carbon monoxide, and a monomer(s) selected from the group consisting of vinyl acetate, vinyl acrylate, and mixtures thereof Preferably the second polymer independently comprises the polymerization product of a composition comprising (i) about 50 to about 88 percent by weight ethylene, (ii) about 10 to about 45 percent by weight of a monomer(s) selected from the group consisting of vinyl acetate, vinyl acrylate, and mixtures thereof, and (iii) about 2 to about 20 percent by weight carbon monoxide, wherein the weight percentages are based upon the total weight of the second polymer.

More preferably each second polymer independently comprises the polymerization product of a composition comprising (i) about 50 to about 77 percent by weight ethylene, (ii) about 18 to about 35 percent by weight of a monomer(s) selected from the group consisting of vinyl acetate, vinyl acrylate, and mixtures thereof, and (iii) about 5 to about 15 percent by weight carbon monoxide, wherein the weight percentages are based upon the total weight of the second polymer.

Representative examples of useful second polymers include ELVALOY 742 EVA ketone containing copolymer with VA content of about 28% and carbon monoxide content of about 9%, ELVALOY HP441 En-BA ketone containing copolymer with n-butyl acrylate content of about 30% and carbon monoxide content of about 10%, and ELVALOY 4924 EVA ketone containing copolymer with VA content of about 21% and carbon monoxide content of about 8% (all available from DuPont).

Receptor Layer Thickness

The thickness of the receptor layer 42 is not necessarily critical, but it is preferably from about 0.0075 to about 0.25 mm (about 0.3 to about 10 mils), more preferably from about 0.013 to about 0.13 mm (about 0.5 to about 5 mils). The thickness ranges are for the total thickness of the receptor layer regardless of whether it is a one sheet blend of first polymer and second polymer or a laminate of a layer comprising first polymer and a layer comprising second polymer. The desired thickness is determined by the intended use of the film and desired characteristics of the imaging medium affecting handling and cutting.

To produce the receptor layer 42 used according to this invention which is a blend of first polymer and second polymer, pellets or powder of resin along with optional resins or additives, as obtained from the manufacturer, are mixed together, melted, and extruded to form a film. The film can be extruded onto the PVC backing layer 50 as described in detail later herein.

When the receptor layer comprises a blend of first polymer(s) and second polymer(s) the receptor layer preferably comprises a blend of about 10 to about 50 percent by weight first polymer(s) and about 50 to about 90 percent by weight of a second polymer(s), wherein the weight percentages are based upon the total weight of the receptor layer. More preferably the receptor layer comprises a blend of about 15 to about 35 percent by weight first polymer(s) and about 65 to about 85 percent by weight second polymer(s), based upon the total weight of the receptor layer. Most preferably the receptor layer comprises a blend of the first polymer(s) in an amount of from about 18 to about 35% by weight and the second polymer(s) in an amount of from about 65 to about 82% by weight, based upon the total weight of the receptor layer.

To produce the receptor layer 62 according to this invention the appropriate pellets or powder of resin of second polymer(s) along with optional resins or additives, as obtained from the manufacturer, are mixed together, melted, and extruded to form a film which will later be the layer 64 of the receptor layer 62 comprising the second polymer. Next, the layer 66 of the receptor layer 62 comprising the first polymer can similarly be formed and extruded thereon to form the receptor layer 62. The receptor layer 62 can be joined to the polyvinyl chloride backing 50 as described later herein.

Alternatively, the layer of the receptor layer which comprises the second polymer can be extruded directly onto the polyvinyl chloride backing layer 50. The layer of the receptor layer comprising the first polymer can then be extruded on top of the layer comprising the second polymer. Alternatively the aforementioned layers can be coextruded.

Ultraviolet Light Stabilizers

A variety of ultraviolet light stabilizers may optionally be used according to the present invention. These may be included in the receptor layer. One class of such components are ultraviolet light absorbers. These materials typically function by absorbing harmful ultraviolet radiation and dissipating it as heat energy. Examples of such materials include but are not limited to those selected from the group consisting of benzotriazoles (such as Tinuvin 328 and Tinuvin 900, available from Ciba-Geigy Corporation, New York), benzophenones (such as Sandover 3041 available from Clariant Corporation, Charlotte, N.C.), and oxalanilides (such as Sandover VSU, available from Clariant Corporation) and triazines such as that available as Cyagard UV-1164 from Cytec Industries Inc., New Jersey.

Another class of such components are ultraviolet light inhibitors. These materials typically trap free radicals with subsequent regeneration of active stabilizer moieties, energy transfer, and peroxide decomposition. Examples of such materials include but are not limited to those selected from the group consisting of hindered amines (such as Tinuvin 292 and Tinuvin 144, both from Ciba-Geigy Corporation).

If ultraviolet light stabilizer is included in the receptor layer, preferably both ultraviolet light absorber and ultraviolet light inhibitor are present at a weight ratio of ultraviolet light absorber to ultraviolet light inhibitor of about 1:3 to about 3:1, more preferably about 1.5:2.5 to about 2.5:1.5.

The receptor layer may further comprise about 0 to about 3 percent by weight of a component (typically 0.1 to about 3 percent, if included) selected from the group consisting of ultraviolet light absorber, ultraviolet light inhibitor, and mixtures thereof, based on the total weight of the receptor layer, more preferably about 0.3 to about 1.5 percent by weight and most preferably about 0.5 to about 1 percent by weight.

Polyvinyl Chloride Backing

The backing layer 50 comprises polyvinyl chloride (PVC). The backing layer 50 may be transparent, colorless, pigmented, or metallized. Opaque, white backing layers are useful for this invention and typically are achieved by the addition to the polymer of conventional pigmenting agents such as titania, calcium carbonate, and talc. Metallized backing layers are also useful and typically are prepared by vapor coating aluminum onto the polymer. Such pigmented or metallized backing layers are particularly preferred when the receptor layer is transparent, or nearly so. In such a construction, the backing layer when bonded to the receptor layer provides an opaque imaging medium which is desirable for many print applications. Such a construction also makes it unnecessary to add pigmenting additives to the receptor layer itself. Such additives may adversely affect the durability of the printed image on the receptor layer. It is also within the scope of the invention to use a transparent imaging medium. The thickness of the backing layer is preferably from about 0.00025 to 0.025 cm (0.0001 to 0.01 inches), and more preferably about 0.013 to 0.13 cm (0.0005 to 0.005 inches). When an opaque backing is desired it preferably has an optical density of 2.5±10% as measured on a MacBeth TD927 densitometer, available from Macbeth of Newburgh, N.Y.

Attachment of Receptor Layer to the Backing

The receptor layer 42, 62 can be bonded (such as by adhesion, for example) to the PVC backing layer 50 by a number of techniques. Suitable joining means include pressure sensitive adhesives, heat activated adhesives, sonic welding, and the like. In one preferred embodiment of imaging medium 40, the receptor layer 42 is extruded on to the backing layer 50 to form a composite structure. The material of the receptor layer 42 is coated onto the backing layer 50 in a molten state by a conventional extrusion process. The temperature of the material of the receptor layer (or one of the individual layers of a receptor layer), when in the extruder, typically ranges from about 250° F. (121° C.) to about 480° F. (249° C.). The temperature of the material of the receptor layer 42 (or one of the individual layers making up a receptor layer) as it exits the extruder is typically from about 350° F. (177° C.) to about 560° F. (293° C.). After the material is extruded onto the backing layer, the thus-formed composite structure can be allowed to cool to typically ambient temperature.

In another preferred embodiment of imaging medium 58 the second layer 64 of the receptor layer 62 comprising the second polymer is extruded on the backing 50, following which the first layer 66 of the receptor layer 62 comprising the first polymer is extruded thereon. As an even more preferred embodiment the first 66 and second 64 layers of the receptor layer may be coextruded.

A preferred embodiment of imaging medium 40 can be prepared by extruding a 0.038 mm (1.5 mil) thick receptor layer 42 comprising a blend of ethylene copolymer and a second polymer component and optionally an ionomeric resin and/or other additives onto a 0.025 mm (1 mil) thick PVC backing layer 50.

In a preferred embodiment, a first polymer component comprising a copolymer comprising ethylene and vinyl acetate commercially available under the trade designation "ELVAX 3175" from du Pont is blended with a second polymer component and is extruded at a thickness of about 0.25 mm (1 mil) onto a PVC backing layer approximately 0.014 mm (0.56 mil) thick.

Adhesives

Adhesives useful in the preparation of an adhesive coated imaging medium according to the present invention include both pressure sensitive and non-pressure sensitive adhesives such as hot melt and curable adhesives. Pressure sensitive adhesives are normally tacky at room temperature and can be adhered to a surface by application of, at most, light finger pressure, while non-pressure sensitive adhesives include solvent, heat, or radiation activated adhesive systems. Pressure sensitive adhesives are a preferred class of adhesives for use in the present invention. Examples of adhesives useful in the invention include those based on general compositions of polyacrylate; polyvinyl ether; diene-containing rubber such as natural rubber, polyisoprene, and polyisobutylene; polychloroprene; butyl rubber; butadiene-acrylonitrile polymer; thermoplastic elastomer; block copolymers such as styrene-isoprene and styrene-isoprene-styrene block copolymers, ethylene-propylene-diene polymers, and styrene-butadiene polymer; poly-alpha-olefin; amorphous polyolefin; silicone; ethylene-containing copolymer such as ethylene vinyl acetate, ethylacrylate, and ethyl methacrylate; polyurethane; polyamide; epoxy; polyvinylpyrrolidone and vinylpyrrolidone copolymers; polyesters; and mixtures of the above. Additionally, the adhesives can contain additives such as tackifiers, plasticizers, fillers, antioxidants, stabilizers, pigments, diffusing particles, curatives, and solvents.

A general description of useful pressure sensitive adhesives may be found in *Encyclopedia of Polymer Science and Engineering*, Vol. 13, Wiley-Interscience Publishers (New York, 1988). Additional description of useful pressure sensitive adhesives may be found in *Encyclopedia of Polymer Science and Technology*, Vol. 1, Interscience Publishers (New York, 1964).

Other pressure sensitive adhesives useful in the invention are described in the patent literature. Examples of these patents include Pat. No. Re 24,906 (Ulrich), U.S. Pat. No. 3,389,827 (Abere et al.), at Col. 4-Col. 5, U.S. Pat. No. 4,080,348 (Korpman), U.S. Pat. No. 4,136,071 (Korpman), U.S. Pat. No. 4,181,752 (Martens et al.), U.S. Pat. No. 4,792,584 (Shiraki et al.), U.S. Pat. No. 4,883,179 (Young et al.), and U.S. Pat. No. 4,952,650 (Young et al.). Commercially available adhesives are also useful in the invention. Examples include those adhesives available from 3M Company, St. Paul, Minn.; H.B. Fuller Company, St. Paul, Minn.; Century Adhesives Corporation, Columbus, Ohio; National Starch and Chemical Corporation, Bridgewater, N.J.; Rohm and Haas Company, Philadelphia, Pa.; and Air Products and Chemicals, Inc., Allentown, Pa.

TONERS

Liquid Toners

Liquid toners typically comprise pigments, binder, carrier solvent, dispersing agents, and charge additives. Preferably, the toner comprises thermoplastic toner particles in a liquid carrier that is not a solvent for the particles at a first temperature and that is a solvent for the particles at a second temperature, especially those disclosed in U.S. Pat. No. 5,192,638, "Toner for Use in Compositions for Developing Latent Electrostatic Images, Method of Making the Same, and Liquid Composition Using the Improved Toner" (Landa et al.), the entire disclosure of which is incorporated herein by reference. Landa et al. '638 discloses a liquid composition for developing latent electrostatic images comprising toner particles associated with a pigment dispersed in a nonpolar liquid. The toner particles are formed with a plurality of fibers or tendrils from a thermoplastic polymer and carry a charge of a polarity opposite to the polarity of the latent electrostatic image. The polymer is insoluble or insolvatable in the dispersant liquid at room temperature. The toner particles are formed by plasticizing the polymer and pigment at elevated temperature and then either permitting a sponge to form and wet-grinding pieces of the sponge or diluting the plasticized polyrner-pigment while cooling and constantly stirring to prevent the forming of a sponge while cooling. When cool, the diluted composition will have a concentration of toner particles formed with a plurality of fibers.

These fibers are formed from a thermoplastic polymer and are such that they may interdigitate, intertwine, or interlink physically in an image developed with a developing liquid through which has been dispersed the toner particles of the instant invention. The result is an image on the photoconductor having good sharpness, line acuity-that is, edge acuity-and a high degree of resolution. The developed image on the photoconductor has good compressive strength, so that it may be transferred from the surface on which it is developed to the imaging medium without squash. The intertwining of the toner particle permits building a thicker image and still obtaining sharpness. The thickness can be controlled by varying the charge potential on the photoconductor, by varying the development time, by varying the toner-particle concentration, by varying the conductivity of the toner particles, by varying the charge characteristics of the toner particles, by varying the particle size, or by varying the surface chemistry of the particles. Any or a combination of these methods may be used.

In addition to being thermoplastic and being able to form fibers as above defined, the polymer used in the particles of Landa et al. '683 preferably has the following characteristics: it is able to disperse a pigment (if a pigment is desired); it is insoluble in the dispersant liquid at temperatures below 40° C., so that it will not dissolve or solvate in storage; it is able to solvate at temperatures above 50° C.; it is able to be ground to form particles between 0.1 micron and 5 microns in diameter; it is able to form a particle of less than 10 microns; it is able to fuse at temperatures in excess of 70° C.; by solvation, the polymers forming the toner particles will become swollen or gelatinous. This indicates the formation of complexes by the combination of the molecules of the polymer with the molecules of the dispersant liquid.

Landa et al. '683 discloses three methods of forming toner particles having the desired fibrous morphology. The first method briefly includes dispersing or dissolving pigment particles in a plasticized polymer at temperatures between 65° C. and 100° C. The plasticized material when cooled has the form of a sponge. The sponge is then broken into smaller pieces and ground. Another method includes dissolving one or more polymers in a nonpolar dispersant, together with particles of a pigment such as carbon black or the like. The solution is allowed to cool slowly while stirring, which is an essential step in this method of forming the fiber-bearing toner particles. As the solution cools, precipitation occurs, and the precipitated particles will be found to have fibers extending therefrom. A third method is to heat a polymer above its melting point and disperse a pigment through it. In this method, fibers are formed by pulling the pigmented thermoplastic polymer apart without first forming a sponge. The fibrous toner particles, formed by any of the foregoing methods, are dispersed in a nonpolar carrier liquid, together with a charge director known to the art, to form a developing composition.

Landa et al. '683 discloses a toner particle formed with a plurality of fibers—that is to say, one with such morphology. Such a toner particle enables forming a developing composition for developing latent electrostatic images by dispersing the toner particles in small amounts in a nonpolar liquid such as an ISOPAR. The weight of the toner particle may be as low as 0.2 percent by weight of the weight of the dispersant liquid. The toner particle is pigmented and formed of a polymeric resin. A charge director is added to the composition in small amounts, which may be as low as one-tenth percent by weight of the weight of the toner particles in the developing composition. The charge director may be selected to impart either a positive or a negative charge to the toner particles, depending on the charge of the latent image. Those in the art will understand that the charge on the toner particles is generally opposite in polarity to that carried by the latent electrostatic image.

In Landa et al. '683, the nonpolar dispersant liquids are, preferably, branched-chain aliphatic hydrocarbons-more particularly, ISOPAR-G, ISOPAR-H, ISOPAR-K, ISOPAR-L, and ISOPAR-M. These ISOPARs are narrow cuts of isoparaffinic hydrocarbon fractions with extremely high levels of purity. For example, the boiling range of ISOPAR-G is between 156° C. and 176° C. ISOPAR-L has a mid-boiling point of approximately 194° C. ISOPAR-M has a flash point of 77° C. and an auto-ignition temperature of 338° C. They are all manufactured by the Exxon Corporation. Light mineral oils, such as MARCOL 52 or MARCOL 62, manufactured by the Humble Oil and Refining Company, may be used. These are higher boiling aliphatic hydrocarbon liquids.

The polymers used in Landa et al. '683 are thermoplastic, and the preferred polymers are known as ELVAX II, manufactured by du Pont, including resin numbers 5550; 5610; 5640; 5650T; 5720; and 5950. The original ELVAX resins (EVA) were the ethylene vinyl acetate copolymers. The new family of ELVAX resins, designated ELVAX II, are ethylene copolymers combining vinyl carboxylic acid functionality, high molecular weight, and thermal stability. The preferred ethylene copolymer resins of Landa et al. '683 are the ELVAX II 5720 and 5610. Other polymers which are usable are the original ELVAX copolymers and polybutyl terephthalate. Still other useful polymers made by Union Carbide are the DQDA 6479 Natural 7 and DQDA 6832 Natural 7. These are ethylene vinyl acetate resins. Other useful polymers are NUCREL ethylene acrylic acid copolymers available form du Pont.

Landa et al. '683 also discloses that another useful class of polymers in making the particles are those manufactured by du Pont and sold under the trademark ELVACITE. These are methacrylate resins, such as polybutyl methacrylate (Grade 2044), polyethyl methacrylate (Grade 2028), and polymethyl methacrylate (Grade 2041). If desired, a minor amount of carnauba wax may be added to the composition. However, this tends to produce bleed-through and an oil fringe on the copy and is not preferred. Furthermore, if a hard polymer such as 5650T is used, a minor amount of hydroxy-ethyl cellulose may be added. This is not preferred.

The polymers of Landa et al. '683 are normally pigmented so as to render the latent image visible, though this need not be done in some applications. The pigment may be present in the amount of 10 percent to 35 percent by weight in respect of the weight of the polymer, if the pigment be Cabot Mogul L (black pigment). If the pigment is a dye, it may be present in an amount of between 3 percent and 25 percent by weight in respect of the weight of the polymer. If no dye is used-as, for example, in making a toner for developing a latent image for a printing plate-an amount of silica such as CABOSIL may be added to make the grinding easier. Examples of pigments are Monastral Blue G (C.I. Pigment Blue 15 C.I. No. 74160), Toluidine Red Y (C.I. Pigment Red 3), Quindo Magenta (Pigment Red 122), Indo Brilliant Scarlet Toner (Pigment Red 123, C.I. No. 71145), Toluidine Red B (C.I. Pigment Red 3), Watchung Red B (C.I. Pigment Red 48), Permanent Rubine F6B 13-1731 (Pigment Red 184), Hansa Yellow (Pigment Yellow 98), Dalamar Yellow (Pigment Yellow 74, C.I. No. 11741), Toluidine Yellow G (C.I. Pigment Yellow 1), Monastral Blue B (C.I. Pigment Blue 15), Monastral Green B (C.I. Pigment Green 7), Pigment Scarlet (C.I. Pigment Red 60), Auric Brown (C.I. Pigment Brown 6), Monastral Green G (Pigment Green 7), Carbon Black, and Stirling NS N 774 (Pigment Black 7, C.I. No. 77266).

Landa et al '683 also discloses that a finely ground ferromagnetic material may be used as a pigment. About 40 percent to about 80 percent by weight of Mapico Black is preferred, with about 65 percent Mapico Black being optimum, other suitable materials such as metals including iron, cobalt, nickel, various magnetic oxides including $Fe_2O_3$, $Fe_3O_4$, and other magnetic oxides; certain ferrites such as zinc, cadmium, barium, manganese; chromium dioxide; various of the permalloys and other alloys such as cobalt-phosphorus, cobalt-nickel, and the like; or mixtures of any of these may be used.

Landa et al. '683 theorizes that, in dispersion, all of the toner particles have the same polarity of charge. When the particles approach each other, they are repelled, owing to the fact that each possesses a charge of the same polarity. When the latent electrostatic image is developed, the toner particles are impelled to go to the latent electrostatic image, which has a higher potential and a charge of opposite polarity. This forces the toner particles to associate with each other and to mat or interdigitate. The fact that the toner particles in the developed image are matted enables a more complete transfer from the photoconductor to be made to the carrier sheet. The matting also prevents spreading of the edges of the image and thus preserves its acuity. The small diameter of the toner particles ensures good resolution, along with the other results outlined above.

It is known that to impart a negative charge to the particles, such charge directors as magnesium petronate, magnesium sulfonate, calcium petronate, calcium sulfonate, barium petronate, barium sulfonate, or the like, may be used. The negatively charged particles are used to develop images carrying a positive charge, as is the case with a selenium-based photoconductor. With a cadmium-based photoconductor, the latent image carries a negative charge and the toner particles must therefore be positively charged. A positive charge can be imparted to the toner particles with a charge director such as aluminum stearate. The amount of charge director added depends on the composition used and can be determined empirically by adding various amounts to samples of the developing liquid.

Figure 3:
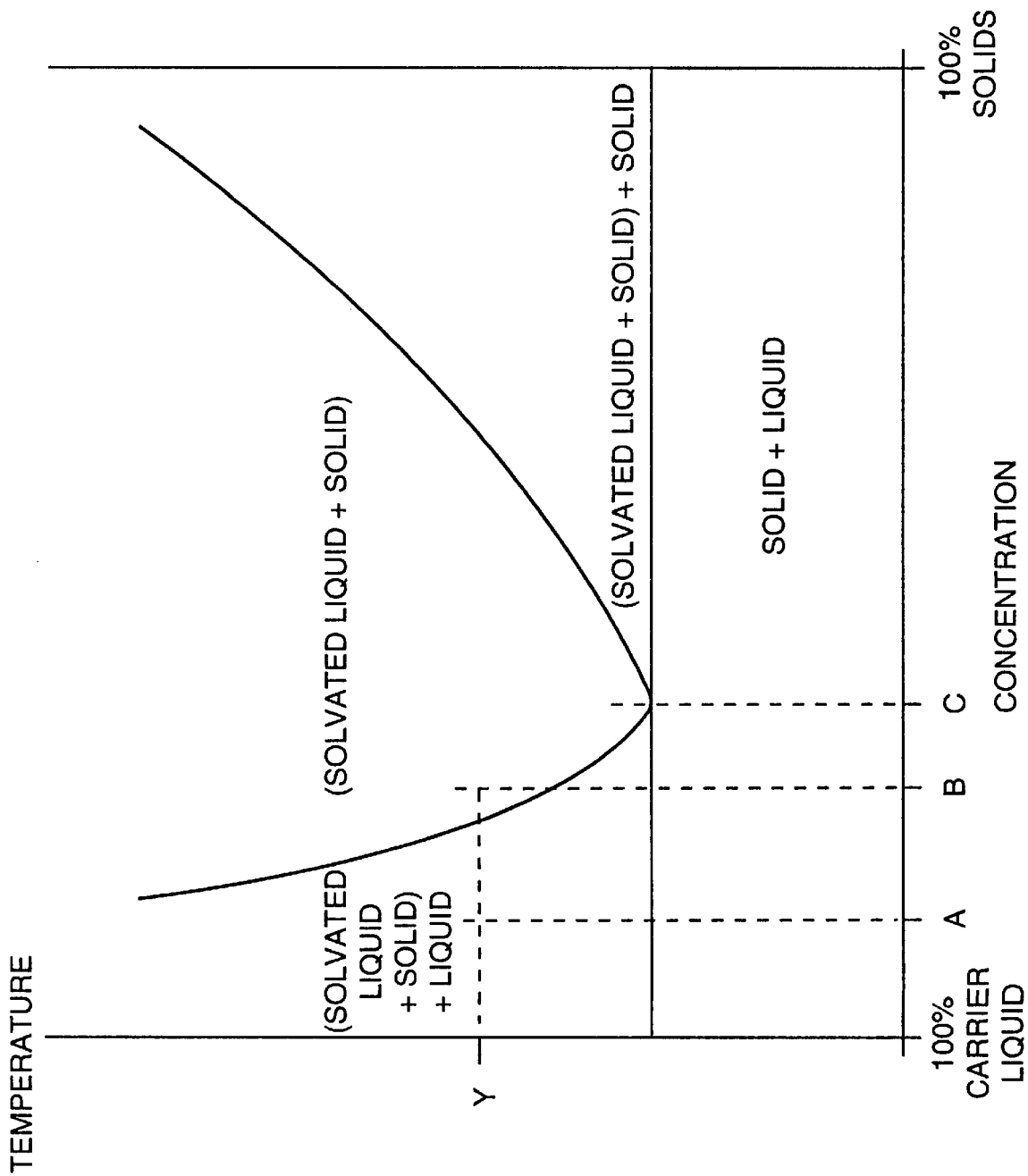
FIG. 3 is part of a simplified typical phase diagram for a preferred toner for use with the present invention.

The invention can be practiced using a variety of toner types but is especially useful for toners comprising carrier liquid and pigmented polymeric toner particles which are essentially non-soluble in the carrier liquid at room temperature, and which solvate carrier liquid at elevated temperatures. This is a characteristic of the toner of Example 1 of U.S. Pat. No. 4,794,651, previously incorporated by reference. Part of a simplified phase diagram of a typical toner of this type is shown in FIG. 3. This diagram represents the states of the polymer portion of the toner particles and the carrier liquid. The pigment in the particles generally takes little part in the process, and references herein to "single phase" and to "solvation" refer to the state of the polymer part of the toner particles together with the carrier liquid. In a preferred embodiment, the toner is prepared by mixing 10 parts of ELVAX II 5950 ethylene vinyl acetate copolymer (from E.I. du Pont) and 5 parts by weight of ISOPAR L (Exxon) diluent which is not a solvent for the ELVAX II 5950 at room temperature. The mixing is performed at low speed in a jacketed double planetary mixer connected to an oil heating unit for one hour, the heating unit being set at 130° C. A mixture of 2.5 parts by weight of Mogul L carbon black (Cabot) and 5 parts by weight of ISOPAR L is then added to the mix in the double planetary mixer and the resultant mixture is further mixed for one hour at high speed. 20 parts by weight of ISOPAR L pre-heated to 110° C. are added to the mixer and mixing is continued at high speed for one hour. The heating unit is disconnected and mixing is continued until the temperature of the mixture drops to 40° C. 100 g of the resulting material is mixed with 120 g of ISOPAR L and the mixture is milled for 19 hours in an attritor to obtain a dispersion of particles. The material is dispersed in ISOPAR L to a solids content of 1.5% by weight. The preferred liquid developer prepared comprises toner particles which are formed with a plurality of fibrous extensions or tendrils, as described above. The preferred toner is characterized in that when the concentration of toner particles is increased above 20%, the viscosity of the material increases greatly, apparently in approximately an exponential manner. A charge director, prepared in accordance with the Example of U.S. Pat. No. 5,047,306, "Humidity Tolerant Charge Director Compositions" (Almog), the entire disclosure of which is incorporated herein by reference, is preferably added to the dispersion in an amount equal to about 3% of the weight of the solids in the developer. Examples of preferred thermoplastic toner particles are selected from the group consisting of ethylene vinyl acrylate copolymers, ethylene vinyl acetate copolymers, ethylene acrylic acid copolymers, ionomers of ethylene acrylic acid copolymers, and mixtures thereof.

A specific example of a preferred toner for use with the present invention is commercially known as ELECTROINK fir E-PRINT 1000 ethylene vinyl acetate based toner manufactured by Indigo Ltd. of Rehovot, Israel.

Dry Toners

Dry thermoplastic toners are also useful according to this present invention. Examples of useful dry thermoplastic toners include but are not limited to those selected from the group consisting of polyester toners (such as those available from Xeikon Nevada). It is theorized that other dry thermoplastic toners would be useful according to the present invention such as styrene/acrylate copolymer available from Lanier Worldwide, Inc.

IMAGING METHODS AND APPARATUS

In electrophotographic processes, an electrostatic image may be produced by providing a photoconductive layer, such as on a rotating drum, with a uniform electrostatic charge and thereafter selectively discharging the electrostatic charge by exposing it to a modulated beam of radiant energy. It will be understood that other methods may be employed to form an electrostatic image, such, for example, as providing a carrier with a dielectric surface and transferring a preformed electrostatic charge to the surface. The charge may be formed from an array of styluses. A latent image is thus formed on the charged drum. Charged toner is deposited on the charged areas of the drum, and the toner is then transferred under heat and/or pressure to the imaging medium 40, 58. Images may be printed on imaging medium 40, 58 using direct image printing or reverse image printing. Preferably, the toner can be transferred in an intermediate step to a transfer member between the charged drum and the imaging medium.

While the present invention can be advantageously used with many known electrophotographic methods and apparatuses, a particularly preferred apparatus and method is disclosed in U.S. Pat. No. 5,276,492, "Imaging Method and Apparatus" (Landa et al.), the entire disclosure of which is incorporated herein by reference.

In a preferred embodiment of the invention, a liquid toner image is transferred from an image forming surface to an intermediate transfer member for subsequent transfer to a final substrate. The liquid toner image includes a liquid portion including carrier liquid and a solids portion including pigmented polymeric toner particles which are essentially non-soluble in the carrier liquid at room temperature, and the polymer portion of which forms substantially a single phase with carrier liquid at elevated temperatures. The preferred imaging method generally includes the steps of concentrating the liquid toner image to a given non-volatile solids percentage by compacting the solids portion thereof and removing carrier liquid therefrom; transferring the liquid toner image to an intermediate transfer member; heating the liquid toner image on the intermediate transfer member to a temperature at least as high as that at which the polymer portion of the toner particles and the carrier liquid form substantially a single phase at the given solids percentage; and transferring the heated liquid toner image to a final substrate.

Liquid toner images are developed by varying the density of pigmented solids in a developer material on a latent image bearing surface in accordance with an imaged pattern. The variations in density are produced by the corresponding pattern of electric fields extending outward from the latent image bearing surface. The fields are produced by the different latent image and background voltages on the latent image bearing surface and a voltage on a developer plate or roller. In general, developed liquid toner images comprise carrier liquid and toner particles and are not homogeneous.

To improve transfer of a developed image from the latent image bearing surface to a substrate, it is most desirable to ensure that, before transfer, the pigmented solids adjacent background regions are substantially removed and that the density of pigmented solids in the developed image is increased, thereby compacting or rigidizing the developed image. Compacting or rigidizing of the developed image increases the image viscosity and enhances the ability of the image to maintain its integrity under the stresses encountered during image transfer It is also desirable that excess liquid be removed from the latent image bearing surface before transfer.

Many methods are known to remove the carrier liquid and pigmented solids in the region beyond the outer edge of the image and thus leave relatively clean areas above the background. The technique of removing carrier liquid is known generally as metering. Known methods include employing a reverse roller spaced about 50 microns from the latent image bearing surface, an air knife, and corona discharge. It is also known to effect image transfer from a photoreceptor onto a substrate backed by a charged roller. Unless the image is rigidized before it reaches the nip of the photoreceptor and the roller, image squash and flow may occur.

Figure 2:
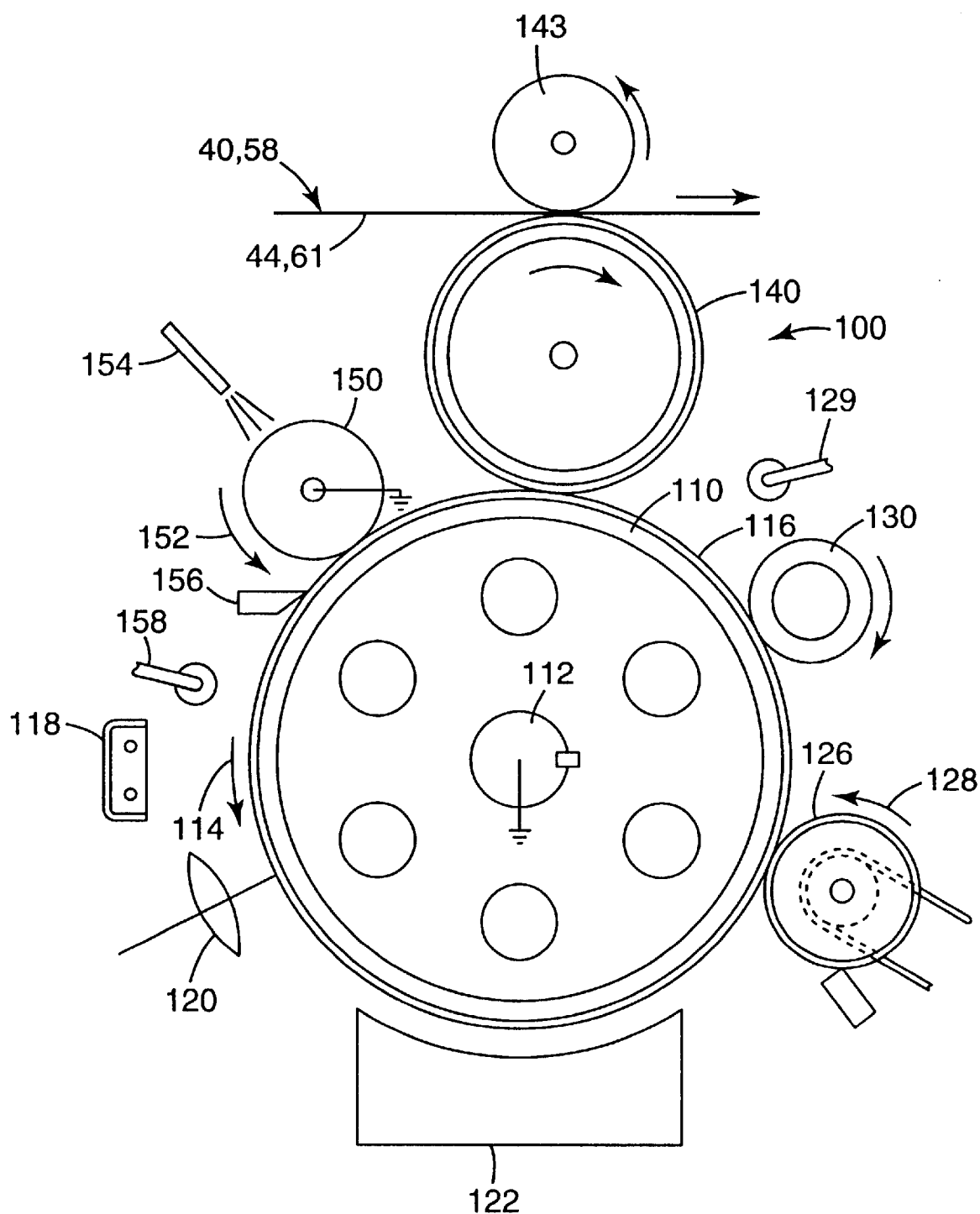
FIG. 2 is a partial schematic view of an electrophotographic imaging apparatus for use with the present invention.

FIG. 2 illustrates a preferred electrophotographic imaging apparatus 100 for use with the present invention. The apparatus is described for liquid developer systems with negatively charged toner particles, and negatively charged photoconductors, i.e., systems operating in the reversal mode. For other combinations of toner particle and photoconductor polarity, the values and polarities of the voltages are changed, in accordance with the principles of the invention.

As in conventional electrophotographic systems, the apparatus 100 of FIG. 2 typically comprises a drum 110 arranged for rotation about an axle 112 in a direction generally indicated by arrow 114. Drum 110 is formed with a cylindrical photoconductor surface 16.

A corona discharge device 118 is operative to generally uniformly charge photoconductor surface 116 with a negative charge. Continued rotation of drum 110 brings charged photoconductor surface 116 into image receiving relationship with an exposure unit including a lens 120, which focuses an image onto charged photoconductor surface 116, selectively discharging the photoconductor surface, thus producing an electrostatic latent image thereon. The latent image comprises image areas at a given range of potentials and background areas at a different potential. The image may be laser generated as in printing from a computer or it may be the image of an original as in a copier.

Continued rotation of drum 110 brings charged photoconductor surface 116, bearing the electrostatic latent image, into a development unit 122, which is operative to apply liquid developer, comprising a solids portion including pigmented toner particles and a liquid portion including carrier liquid, to develop the electrostatic latent image. The developed image includes image areas having pigmented toner particles thereon and background areas. Development unit 122 may be a single color developer of any conventional type, or may be a plurality of single color developers for the production of full color images as is known in the art. Alternatively, full color images may be produced by changing the liquid toner in the development unit when the color to be printed is changed. Alternatively, highlight color development may be employed, as is known in the art.

In accordance with a preferred embodiment of the invention, following application of toner thereto, photoconductor surface 116 passes a typically charged rotating roller 126, preferably rotating in a direction indicated by an arrow 128. Typically, the spatial separation of the roller 126 from the photoconductor surface 116 is about 50 microns. Roller 126 thus acts as a metering roller as is known in the art, reducing the amount of carrier liquid on the background areas and reducing the amount of liquid overlaying the image. Preferably the potential on roller 126 is intermediate that of the latent image areas and of the background areas on the photoconductor surface. Typical approximate voltages are: roller 126: 500 V, background area: 1000 V and latent image areas: 150 V. The liquid toner image which passes roller 126 should be relatively free of pigmented particles except in the region of the latent image.

Downstream of roller 126 there is preferably provided a rigidizing roller 130. Rigidizing roller 130 is preferably formed of resilient polymeric material, such as polyurethane which may have only its natural conductivity or which may be filled with carbon black to increase its conductivity. According to one embodiment of the invention, roller 130 is urged against photoconductor surface 116 as by a spring mounting (not shown). The surface of roller 130 typically moves in the same direction and with the same velocity as the photoconductor surface to remove liquid from the image.

Preferably, the biased squeegee described in U.S. Pat. No. 4,286,039, "Method and Apparatus for Removing Excess Developing Liquid From Photoconductive Surfaces" (Landa et al.), the entire disclosure of which is incorporated herein by reference, is used as the roller 130. Roller 130 is biased to a potential of at least several hundred and up to several thousand Volts with respect to the potential of the developed image on photoconductor surface 116, so that it repels the charged pigmented particles and causes them to more closely approach the image areas of photoconductor surface 116, thus compacting and rigidizing the image.

In a preferred embodiment of the invention, rigidizing roller 130 comprises an aluminum core having a 20 mm diameter, coated with a 4 mm thick carbon-filled polyurethane coating having a Shore A hardness of about 30–35, and a volume resistivity of about $10^8$ ohm-cm. Preferably roller 130 is urged against photoconductor surface 116 with a pressure of about 40–70 grams per linear cm of contact, which extends along the length of the drum. The core of rigidizing roller 130 is energized to between about 1800 and 2800 volts, to provide a voltage difference of preferably between about 1600 and 2700 volts between the core and the photoconductor surface in the image areas. Voltage differences of as low as 600 volts are also useful.

After rigidization under these conditions and for the preferred toner, the solids percentage in the image portion is believed to be as high as 35% or more, when carrier liquid absorbed as plasticizer is considered as part of the solids portion. It is preferable to have an image with at least 25–30% solids, after rigidizing. When the solids percentage is calculated on a non-volatile solids basis, the solids percentage is preferably above 20% and is usually less than 30%. Values of 25% have been found to be especially useful. At these concentrations the material has a paste like consistency.

Alternatively, the carbon filled polyurethane can be replaced by unfilled polyurethane with a volume resistivity of about $3 \times 10^{10}$, and the voltage is adjusted to give proper rigidizing.

Downstream of rigidizing roller 130 there is preferably provided a plurality of light emitting diodes (LEDs) 129 to discharge the photoconductor surface, and equalize the potential between image and background areas. For process color systems, where yellow, magenta and cyan toners are used, both red and green LEDs are provided to discharge the areas of the photoconductor behind the developed image as well as the background areas.

Downstream of LEDs 129 there is provided an intermediate transfer member 140, which rotates in a direction opposite to that of photoconductor surface 116, as shown by arrow 141. The intermediate transfer member is operative for receiving the toner image from the photoconductor surface and for subsequently transferring the toner image to the imaging medium 40 or 58.

Various types of intermediate transfer members are known and are described, for example, in U.S. Pat. No. 4,684,238, "Intermediate Transfer Apparatus" (Till et al.) and U.S. Pat. No. 5,028,964, "Imaging System With Rigidizer And Intermediate Transfer Member" (Landa et al.) the entire disclosures of both of which are incorporated herein by reference.

In general, intermediate transfer member 140 is urged against photoconductor surface 116. One of the effects of the rigidization described above is to prevent substantial squash or other distortion of the image caused by the pressure resulting from the urging. The rigidization effect is especially pronounced due to the sharp increase of viscosity with concentration for the preferred toner.

Transfer of the image to intermediate transfer member is preferably aided by providing electrical bias to the intermediate transfer member 140 to attract the charged toner thereto, although other methods known in the art may be employed. Subsequent transfer of the image to imaging surface 44 or 61 of receptor layer 42 or 62, respectively, on the imaging medium is preferably aided by heat and pressure, with pressure applied by a backing roller 143, although other methods known in the art may be employed.

Following transfer of the toner image to the intermediate transfer member, photoconductor surface 116 is engaged by a cleaning roller 150, which typically rotates in a direction indicated by an arrow 152, such that its surface moves in a direction opposite to the movement of adjacent photoconductor surface 116 which it operatively engages. Cleaning roller 150 is operative to scrub and clean surface 116. A cleaning material, such as toner, may be supplied to the cleaning roller 150, via a conduit 154. A wiper blade 156 completes the cleaning of the photoconductor surface. Any residual charge left on photoconductor surface 116 is removed by flooding the photoconductor surface with light from a lamp 158.

In a multi-color system, subsequent to completion of the cycle for one color, the cycle is sequentially repeated for other colors which are sequentially transferred from photoconductor surface 116 to intermediate transfer member 140. The single color images may be sequentially transferred to the imaging medium 40 or 58 in alignment, or may alternatively be overlaid on the intermediate transfer member 140 and transferred as a group to the imaging medium.

Details of the construction of the surface layers of preferred intermediate transfer members are shown in U.S. Pat. No. 5,089,856, "Image Transfer Apparatus Incorporating An Integral Heater" (Landa et al.), the entire disclosure of which is incorporated herein by reference. Generally, the image is heated on intermediate transfer member 140 in order to facilitate its transfer to imaging medium 40 or 58. This heating is preferably to a temperature above a threshold temperature of substantial solvation of the carrier liquid in the toner particles.

As seen in FIG. 3, when the image is heated, the state of the image, i.e. of the polymer portion of the toner particles and the carrier liquid, depends on several factors, mainly on the temperature of the intermediate transfer member and on the concentration of toner particles. Thus, if the percentage of toner particles is "A" and the intermediate transfer member temperature is "Y" the liquid image separates into two phases, one phase being substantially a liquid polymer/carrier-liquid phase and the other phase consisting mainly of carrier liquid. On the other hand, if the percentage of toner particles is "B" at the same temperature, then substantially only one phase, a liquid polymer/carrier-liquid phase will be present. It is believed to be preferable that separate liquid polymer/carrier-liquid and liquid phases do not form to any substantial degree, as will be the case for example if the concentration is "C".

This type of phase separation is believed to be undesirable on the intermediate transfer member 140. It is believed that an absence of substantial phase separation of this type in the image on the intermediate transfer member results in improved image quality, including an improvement in line uniformity.

It is understood that heating the image on the intermediate transfer member 140 is not meant to completely dry the image, although some evaporation of carrier liquid may result. Rather, the image on the intermediate transfer member remains a viscous liquid until its transfer to the final substrate.

Other methods of concentrating the image than those just described, i.e., compacting the solids portion thereof and removing liquid therefrom, can be utilized provided they concentrate the image to the extent required. These methods include the use of separate solids portion compactors and liquid removal means, such as those described in U.S. Pat. No. 5,028,964, previously incorporated herein by reference. Alternatively the apparatus may utilize a solids portion compactor followed by an intermediate transfer member urged against the photoconductor to remove liquid from the image. As a further alternative, the commutated intermediate transfer member described in the '964 patent may be used to provide both solids portion compacting and liquid removal, just prior to transfer to the intermediate transfer member. Furthermore the concentrating step may take place on the intermediate transfer member after transfer of the liquid toner image thereto and before heating the image.

The receptor layers of the present invention provide a superior bond to the toners described herein when applied by electrophotographic printing methods just described. This is believed to result from the chemical compatibility between the toner's carrier resin and the receptor layer. Without desiring to be bound by any particular theory, it is presently believed that the thermoplastic toners described herein have a solubility parameter that is a close match to that of the receptor layer. This indicates a chemical compatibility between the receptor layer and the toner polymer resulting in a strong bond between the toner and the receptor layer.

The imaging media of the present invention are particularly durable and abrasion resistant in addition to being readily printable by the short run methods described herein.

The method of the present invention employing a dry toner can, for example, employ a copy machine such as Hewlett Packard Laser Jet copy machine available from Hewlett Packard or a Lanier 6540 copier available from Lanier Worldwide, Inc.

Uses

The imaging media of the present invention are well suited for use as labels, tags, tickets, signs, data cards, name plates, and packaging films, for example, although the uses of the imaging media of the present invention are not thereby limited.

Properties

The imaging medium of the present invention typically has a T-Peel adhesion value of at least about 32 oz/in (358 g/cm), preferably at least about 60 oz/in (671 g/cm), and most preferably at least about 80 oz/in (894 g/cm).

The imaged medium of the present invention typically has a print quality value of at least about fair, preferably at least about fair/good, and most preferably at least about good, when printed by either or both the Xeikon and Indigo printing methods such as those described later herein.

The imaged medium of the present invention typically has a Taber abrasion resistance value of at least about 6 (most typically at least 6), preferably at least about 7, and most preferably at least 8 when printed by either or both the Xeikon and Indigo printing methods such as those described later herein (as well as other electrophotographic printing methods).

The above described properties can, for example, be measured on an image which is produced by a four-color process (yellow, magenta, cyan, black). Such a four-color process was used according to the test methods and examples below.

TEST METHODS

The following test methods are utilized herein.

Taber Abrasion Resistance Test

The following abrasion test was used herein. A modified version of ASTM Test method Designation: D 4060-81, Standard Test Method for ABRASION RESISTANCE OF ORGANIC COATINGS BY THE TABER ABRASER, was used (pp. 918–920 of the 1982 ANNUAL BOOK OF ASTM STANDARDS, Part 27, ASTM, Philadelphia, Penn., U.S.A.) incorporated by reference herein. The following machine was used: a Taber Abraser Model 503 (Standard Abrasion Tester) by Teledyne Taber, Tonawanda, N.Y. The apparatus used was such that the abrasive wheels used according to 5.2 were resilient calibrated wheels No. CS-10. With respect to 6.1, the specimens were 4 in. (108 mm) square with rounded corners and with a ¼ in. (6.3 mm) hole centrally located on each panel. With respect to 7.1 the load on the wheels was adjusted to 250 g. With respect to 7.3 the suction regulator was set to approximately 100% on the dial. According to 9.4 the specified number of cycles was 100. Sections 8, 10, 11, and 12 of the test were not employed.

A limitation is included in certain claims that an image formed by a liquid toner and/or an image formed by a dry thermoplastic toner on the receptor layer must have a certain Taber abrasion resistance value. In order to test compliance with this requirement, one would provide an image on an imaging medium receptor layer with the Indigo printer and liquid toner as discussed in the Print Quality Section in order to test an image formed from a liquid toner. In order to test an image formed from a dry toner, one would use the Xeikon printer and dry thermoplastic toner discussed in the Print Quality Test in order to provide an image formed from a dry toner. Images thus provided could be tested for Taber abrasion resistance.

(Although it is desirable that the imaging medium of the invention having an image provided on its surface according to any of the methods and toners described herein have an acceptable Taber abrasion resistance value, this test method provides a convenient, consistent means of making such a determination.)

T-Peel Adhesion Test

T-peel adhesion of heat sealed samples was measured using two samples, each 4–5 inches (10.2–12.7 cm) down-web by 6 inches (15.2 cm) cross-web, cut from an imaging medium comprising a receptor layer and a backing. The two cut samples were placed receptor layer to receptor layer and put in a heat sealer (Model No. 12 AS, from Sentinel Machinery Packaging Industries, Montclair, N.J.) set at 300° F. (149° C.) with a pressure of 40 p.s.i. (19.5 g/cm$^2$) and a dwell time of 1 second. The resultant heat sealed sample was removed from the heat sealer and stored at about 73° F. (22.8° C.)/50% relative humidity for about 24 hours. Three strips, each 2.5 cm wide and 10.2 cm long, were cut from the heat sealed sample perpendicular to and across the sealed area to form a test sample of about 1 inch (2.54 cm) square with unsealed leaders on each edge. One leader of the test sample was clamped in the upper jaw of an INSTRON Tensile Tester (Model No. 1123) and the other leader was clamped in the lower jaw of the tensile tester. The test sample was separated at a rate of 12 inches (30.48 cm)/minute.

Print Quality Test

Printing on the imaging medium was performed by either the Indigo press or the Xeikon press. The Indigo press utilized was a Scorpion model press available from Indigo. The Xeikon press utilized was a DCP-1 model press available from Xeikon. When the Indigo press was utilized, the imaging medium was web fed into the press at 200 steps using a blanket setup temperature of 140° C. The liquid toner used with the Indigo press was an ethylene vinyl acetate based toner known as ELECTROINK for E-PRINT 1000 manufactured by Indigo Ltd. of Rehovot, Israel. When the Xeikon press was utilized, the imaging medium was also web fed by using radiation heat to fuse the powder toner of the image at approximately 400° F. (204.4° C.). The dry powder toner used with the Xeikon press was a polyester toner available from Xeikon under the name Xeikon toner.

The print quality was assessed visually by holding the printed film at normal reading distance (about 12 inches [30.5 cm]) from the naked eye. "No Printing" indicates that no portion of an image was transferred from the blanket to the receptor; "Poor" indicates that less than about 50% of the image was transferred; "Fair" indicates that 50–80% of the image was transferred; "Fair/Good" indicates that greater than 80% but less than 95% of the image was transferred; and "Good" indicates that at least about 95% of the images was transferred.

EXAMPLES

The following examples are offered to aid in the understanding of the present invention and are not to be construed as limiting the scope thereof. Unless otherwise indicated, all parts and percentages are by weight. In the following examples, all images were direct printed.

Comparative Examples 1–5

An imaging medium comprising a receptor layer and a backing was prepared in Comparative Examples 1–5 in TABLE I.

For Comparative Examples 1a and 1b, films of SCOTCHPAK™ SP-132 and SCOTCHPAK™ SP-241 respectively (2-layer film composites of polyethylene terephthalate ("PET") and polyethylene; commercially available from Minnesota Mining and Manufacturing Company (3M Company) were independently heat sealed directly onto a 4 mil (0.1 mm) thick clear, flexible polyvinyl chloride ("PVC") film backing [No. 7603; commercially available from Minnesota Mining and Manufacturing Company (3M Company) under the trademark SCOTCHMARK™]. Heat sealed samples were prepared as described in the T-peel Adhesion Test, except that the cut sample of the SCOTCHPAK™ film was placed onto the PVC film with the polyethylene layer adjacent to the PVC. Strips cut from the heat sealed sample were tested as described in the T-Peel Adhesion Test.

For Comparative Examples 2–4, the polymers, all commercially available from DuPont, were independently extruded onto 0.56 mil (0.014 mm) PET film backing. Pellets of each polymer were melted and extruded at 1.5 mil (0.038 mm) coating thickness onto the PET film and ultraviolet light treated at 280° F. (138° C.). The extruder temperature profile was zone 1=200° F. (93° C.), zone 2=300° F. (149° C.) and zone 3=400° F. (205° C.). The die temperature was 400° F. (205° C.). "Samples for T-Peel adhesion were prepared as described in the T-Peel Adhesion Test.

For Comparative Example 5, the polymers were melted and extruded at 1.5 mil (0.038 mm) coating thickness onto the 4.0 mil (0.1 mm) PVC film used for Comparative Examples 1a and 1b.

Adhesion of the receptor layer to the backing was measured using the T-Peel Adhesion Test. The results (in g/cm) reported in TABLE I are the average of three independent determinations. "Poor" indicates that the adhesion of the receptor layer to the backing was so weak that it could not be measured by the tensile tester or that the receptor layer had delaminated from the backing.

Print quality was assessed using the Print Quality Test.

The data in TABLE I show that adhesion of the receptor layer to the PVC film backing was poor for all polymers tested, except for the polymers of Comparative Examples 5a–c which were ketone containing ELVALOY polymers. All samples were run on the Indigo press and most of the samples were run on the Xeikon press with the print quality for each visually assessed and reported in TABLE I.

TABLE I

| Com Ex. | Receptor Layer | Adhesion to PVC (g/cm) | Indigo Print Quality | Xeikon Print Quality |
|---|---|---|---|---|
| | Polyolefins | | | |
| 1a | SP-132[1] | Poor | Poor | Poor |
| 1b | SP-241[2] | Poor | Fair | Poor |
| | Ethylene Acrylic Acid Copolymers | | | |
| 2a | NUCREL 3990[3] (E-AA) | Poor | Good | Good |
| 2b | NUCREL 0910[4] (E-MA) | Poor | Good | Good |
| | Ionomers | | | |
| 3a | SURLYN 1605[5] (Na) | Poor | Good | — |
| 3b | SURLYN 1705[6] (Zn) | Poor | Good | — |
| | EVA | | | |
| 4a | ELVAX 3134[7] | Poor | Poor | Poor |
| 4b | ELVAX 3174[8] | Poor | Fair | Poor |
| 4c | ELVAX 3175[9] | Poor | Good | Good |
| | Ketone Containing Copolymers | | | |
| 5a | ELVALOY 742[10] | 1182.8 | No Print | Good |
| 5b | ELVALOY HP441[11] | 1140.4 | No Print | Good |
| 5c | ELVALOY 4924[12] | 1285.7 | No Print | Good |

[1]Low Density Polyethylene available from 3M (2.0 mil [0.05 mm] low density polyethylene film on a 0.56 mil [0.014 mm] PET film).
[2]Linear Low Density Polyethylene available from 3M (a 3.5 mil [0.09 mm] linear low density polyethylene film on a 0.56 mil [0.014 mm] PET film).
[3]Ethylene acrylic acid copolymer, melt index ("MI") 10.5 g/10 min.; acrylic acid content 9.0 percent; available from DuPont.
[4]Ethylene methacrylic acid copolymer; MI 10.0 g/10 min.; methacrylic acid content 8.7 percent; available from DuPont.
[5]Neutralized ethylene-co-methacrylic acid ionomeric polymer; about 5% acid neutralized with sodium cation; MI of about 2.8 g/10 min.; about 10% acid content; available from DuPont.
[6]Neutralized ethylene-co-methacrylic acid ionomeric polymer; about 3% acid neutralized with zinc cation; MI of about 5.5 g/10 min.; about 12% acid content; available from DuPont.
[7]Ethylene vinyl acetate ("EVA") copolymer with vinyl acetate ("VA") content of about 12% and MI of about 8.0 g/10 min.; available from DuPont.
[8]EVA copolymer with VA content of about 18% and MI of about 8.0 g/10 min.; available from DuPont.
[9]EVA copolymer with VA content of about 28% and MI of about 6.0 g/10 min.; available from DuPont.
[10]EVA ketone containing copolymer with VA content of about 28% and carbon monoxide content of about 9%; available from DuPont.

TABLE I-continued

| Com Ex. | Receptor Layer | Adhesion to PVC (g/cm) | Indigo Print Quality | Xeikon Print Quality |
|---|---|---|---|---|

[11]Ethylene n-butyl acrylate ketone containing copolymer with acrylate content of about 30% and carbon monoxide content of about 10%; available from DuPont.
[12]EVA ketone containing copolymer with VA content of about 21% and carbon monoxide content of about 8%; available from DuPont.

Examples 6–12 Blended Receptor Layer

An imaging medium comprising a single receptor layer (a blend of first polymer and second polymer) and a PVC backing was prepared using the resins (all commercially available from duPont) set out in TABLE II. For each example number (Ex. No.), pellets of the two resins were mixed by dry blending and the resultant mixture was extruded onto the PVC film backing. The extruder temperature profile was: zone 1=200° F. (93° C.); zone 2=300° F. (149° C.); zone 3=400° F. (205° C.). The die temperature was 400° F. (205° C.). The receptor layer was extruded at 1.5 mil (0.038 mm) coating thickness onto the PVC side of 7912 white flexible PVC film [a prelaminated PVC label stock comprising 4.5 mil (0.114 mm) PVC/0.8 mil (0.02 mm) acrylate pressure sensitive adhesive/5.0 mil (0.127 mm) silicone coated paper commercially available from 3M under the trademark SCOTCHMARK™.

All samples were run on the Indigo press and print quality assessed using the Quality Test. Taber abrasion resistance was measured on the imaged samples the Taber Abrasion Resistance Test.

T-peel adhesion of the samples was measured as described for Comparative Examples 1–5.

TABLE II

| Ex. No. | Receptor Layer Blend First Polymer:Second Polymer | Indigo Print Quality/ Taber Abrasion Resistance | Adhesion to PVC (g/cm) |
|---|---|---|---|
| 6 | 25% ELVAX 3175:75% ELVALOY 4924 | good/8.5 | 1358.4 |
| 7 | 25% ELVAX 4260[1]:75% ELVALOY 4924 | good/8.0 | 1643.5 |
| 8 | 25% BYNEL CXA 1123[2]:75% ELVALOY 4924 | good/6.5 | 1710.5 |
| 9 | 25% BYNEL CXA E-214[3]:75% ELVALOY 4924 | good/6.5 | 1546.2 |
| 10 | 25% BYNEL CXA 3101[4]:75% ELVALOY 4924 | good/7.0 | 1565.2 |
| 11 | 25% BYNEL CXA E-129[5]:75% ELVALOY 4924 | good/7.0 | 1649.1 |
| 12 | 25% APPEAL 1181[6]:75% ELVALOY 4924 | good/7.5 | 1727.3 |

[1]EVA copolymer with VA content of about 28% and MI of about 6.0 g/10 min.
[2]Acrylic acid modified EVA with MI of about 6.6 g/10 min.
[3]Methacrylic acid modified EVA with MI of about 7.9 g/10 min.
[4]Acid and acrylate modified EVA with MI of about 3.5 g/10 min.
[5]Acid and acrylate modified EVA with MI of about 9.0 g/10 min.
[6]Modified EVA with MI of about 9.0 g/10 min.

Examples 6–12 of the present invention all demonstrate good adhesion of the receptor layer to the backing as well as good printing quality with an Indigo printing process and good Taber abrasion resistance.

Examples 13–19-Laminate Receptor Layer

For each example in TABLE III, an imaging medium comprising a receptor layer and a backing was prepared by extruding the resins in two separate layers at a total coating thickness of 2.5 mil (0.063 mm) onto 3M 7912 white flexible PVC film which was previously described in Examples 6–12. Two extruders were utilized with the extruder temperature profile and die temperature as described in Examples 6–12. The ketone polymer (for example, ELVALOY 4924 in Example No. 13) was extruded onto the PVC film backing first at a coating thickness of 1.0 mil (0.025 mm), followed by extrusion of the ethylene polymer (for example, ELVAX 3175 in Example No. 13) at a coating thickness of 1.5 mil (0.038 mm).

All samples were run on the Indigo press and print quality assessed using the Print Quality Test. Taber abrasion resistance was measured on the imaged samples using the Taber Abrasion Resistance Test.

T-peel adhesion of samples was measured as described in Comparative Examples 1–5. The results are reported in TABLE III

TABLE III

| Ex. No. | Receptor Layer Second Polymer:First Polymer | Indigo Print Quality/ Taber abrasion resistance | Adhesion to PVC (g/cm) |
|---|---|---|---|
| 13 | ELVALOY 4924:ELVAX 3175 | good/8.5 | 1076.6 |
| 14 | ELVALOY 4924:ELVAX 4260 | good/8.5 | 1188.4 |
| 15 | ELVALOY 4924:BYNEL CXA 1123 | good/8.0 | 1118.0 |
| 16 | ELVALOY 4924:BYNEL CXA E-214 | good/7.5 | 1188.4 |
| 17 | ELVALOY 4924:BYNEL CXA 3101 | good/7.5 | 1118.0 |
| 18 | ELVALOY 4924:BYNEL CXA E-129 | good/7.0 | 1076.6 |
| 19 | ELVALOY 4924:APPEAL 1181 | good/8.0 | 1244.3 |

According to the above data, Examples 13–19 of the present invention all demonstrate good adhesion and good print quality as well as good Taber abrasion resistance.

Comparative Examples 20–22/Example 6

All samples in the following table were run on both the Indigo press and the Xeikon press and print quality assessed using the Print Quality Test. Taber abrasion resistance was measured on the imaged samples using the Taber Abrasion Resistance Test.

The data in the following table demonstrates the good print quality of an embodiment of the present invention (Example 6) for both Xeikon and Indigo printing as well as good Taber abrasion resistance. The Comparative Examples 20–22 listed in the table below did not demonstrate the combination of good printability and good Taber abrasion resistance that the present invention (Example 6) did.

| Imaging Medium | Indigo PQ[5]/TAR[6] | Xeikon PQ/TAR |
|---|---|---|
| Ex. 6 | good/8.5–9 | good/8.0–8.5 |
| Comp. Ex. 20 Scotchmark ® 7603[1] | no print/nm[4] | good/3 |
| Comp. Ex. 21 Scotchmark ® 170-10 PVC[2] | no print/nm[4] | good/4 |
| Comp. Ex. 22 Topaz ® Coated PA/PVC[3] | good/5 | good/4 |

[1]4.0 mil (0.1 mm) thick soft clear PVC available from Minnesota Mining and Manufacturing Company
[2]a PVC film available from Minnesota Mining and Manufacturing Company
[3]available from Engraph Inc., Cold Springs Kentucky
[4]nm = not measurable due to the fact that there was no image printed on which to take the measurement
[5]PQ = print quality
[6]Taber abrasion resistance The present invention has now been described with reference to several embodiments thereof. The foregoing detailed description has been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. An imaging medium comprising:
   (a) a receptor layer, wherein the receptor layer comprises a blend of about 5 to about 65 percent by weight first polymer(s) and about 35 to about 95 percent by weight of a second polymer(s), wherein the weight percentages of the first polymer(s) and the second polymer(s) are based upon the total weight of the receptor layer, wherein each first polymer independently comprises the polymerization product of a composition comprising (i) ethylene, (ii) monomer(s) selected from the group consisting of vinyl acetate, vinyl acrylate, vinyl carboxylic acid(s) and mixtures thereof, and (iii) optionally an anhydride(s), and each second polymer independently comprises the polymerization product of a composition comprising (i) ethylene, (ii) monomer(s) selected from the group consisting of vinyl acetate, vinyl acrylate, and mixtures thereof, and (iii) carbon monoxide, wherein the receptor layer has a melt index of at least about 2.5 grams/10 minutes; and
   (b) a polyvinyl chloride backing layer bonded to the receptor layer;
   wherein the composition of the receptor layer is selected such that the T-peel adhesion of the receptor layer to the polyvinyl chloride backing layer is at least about 358 g/cm, and such that at least one of the following is true:
   (i) the Taber abrasion resistance test value for an image electrophotographically formed on the receptor layer with a liquid toner is at least about 6;
   (ii) the Taber abrasion resistance test value for an image electrophotographically formed on the receptor layer with a dry thermoplastic toner is at least about 6.

2. An imaging medium comprising:
   (a) a receptor layer, wherein the receptor layer comprises a laminate comprising (I) a first layer comprising a first polymer(s), wherein the first layer comprises at least about 10 percent by weight first polymer(s) based upon the total weight of the first layer and (II) a second layer comprising a second polymer(s), wherein the second layer comprises at least about 35 percent second polymer(s) based upon the total weight of the second layer,
   wherein each first polymer independently comprises the polymerization product of a composition comprising (i) ethylene, (ii) monomer(s) selected from the group consisting of vinyl acetate, vinyl acrylate, vinyl carboxylic acids and mixtures thereof, and (iii) optionally an anhydride(s), and each second polymer independently comprises the polymerization product of a composition comprising (i) ethylene, (ii) monomer(s) selected from the group consisting of vinyl acetate, vinyl acrylate, and mixtures thereof, and (iii) carbon monoxide, and wherein the receptor layer has a melt index of at least about 2.5 grams/10 minutes; and
   (b) a polyvinyl chloride backing layer bonded to the receptor layer such that the second layer of the receptor layer is closest to the polyvinyl chloride backing layer;
   wherein the composition of the receptor layer is selected such that the T-peel adhesion of the receptor layer to the polyvinyl chloride backing layer is at least about 358 g/cm, and such that at least one of the following is true:
   (i) the Taber abrasion resistance test value for an image electrophotographically formed on the receptor layer with a liquid toner is at least about 6;
   (ii) the Taber abrasion resistance test value for an image electrophotographically formed on the receptor layer with a dry thermoplastic toner is at least about 6.

3. The imaging medium of claim 1 or 2 wherein at least one of the following is true:
   (i) the Taber abrasion resistance test value for an image formed on the receptor layer with a liquid toner is at least about 7;
   (ii) the Taber abrasion resistance test value for an image formed on the receptor layer with a dry toner is at least about 7.

4. The imaging medium of claim 1 or 2 at least one of the following is true:
   (i) the Taber abrasion resistance test value for an image formed on the receptor layer with a liquid toner is at least about 8;
   (ii) the Taber abrasion resistance test value for an image formed on the receptor layer with a dry toner is at least about 8.

5. The imaging medium of claim 1 or 2 wherein the T-peel adhesion value is at least about 671 g/cm.

6. The imaging medium of claim 1 or 2 wherein the T-peel adhesion value is at least about 894 g/cm.

7. The imaging medium of claim 1 or 2 wherein the first polymer(s) are selected from the group consisting of:
   ethylene/vinyl carboxylic acid copolymers, each ethylene/vinyl carboxylic acid copolymer independently comprising about 75 to about 99 percent by weight ethylene and about 1 to about 25 weight percent vinyl carboxylic acid, based upon the total weight of the ethylene/vinyl carboxylic acid copolymer;
   ethylene/vinyl acetate copolymers, each ethylene/vinyl acetate copolymer independently comprising about 52 to about 85 percent by weight ethylene and about 15 to about 48 weight percent vinyl acetate, based upon the total weight of the ethylene/vinyl acetate copolymer;
   ethylene/vinyl acrylate copolymers, each ethylene/vinyl acrylate copolymer independently comprising about 60 to about 90 percent by weight ethylene and about 10 to about 40 weight percent vinyl acrylate, based upon the total weight of the ethylene/vinyl acrylate copolymer;
   ethylene/vinyl carboxylic acid/vinyl acetate copolymers, each ethylene/vinyl carboxylic acid/vinyl acetate copolymer independently comprising about 37 to about 89 percent by weight ethylene, about 1 to about 15 weight percent vinyl carboxylic acid, and about 10 to about 48 percent by weight vinyl acetate based upon the total weight of the ethylene/vinyl carboxylic acid/vinyl acetate copolymer;
   ethylene/vinyl carboxylic acid/vinyl acrylate copolymers, each ethylene/vinyl carboxylic acid/vinyl acrylate copolymer independently comprising about 45 to about 89 percent by weight ethylene, about 1 to about 15 weight percent vinyl carboxylic acid, and about 10 to about 40 percent by weight vinyl acrylate based upon the total weight of the ethylene/vinyl carboxylic acid/vinyl acrylate copolymer;
   ethylene/anhydride/vinyl acetate copolymers, each ethylene/anhydride/vinyl acetate copolymer independently comprising about 37 to about 89.9 percent by weight ethylene, about 0.1 to about 15 weight percent anhydride, and about 10 to about 48 percent by weight vinyl acetate based upon the total weight of the ethylene/anhydride/vinyl acetate copolymer;

ethylene/anhydride/vinyl acrylate copolymers, each ethylene/anhydride/vinyl acrylate copolymer independently comprising about 45 to about 94.9 percent by weight ethylene, about 0.1 to about 15 weight percent anhydride, and about 5 to about 40 percent by weight vinyl acrylate based upon the total weight of the ethylene/anhydride/vinyl acrylate copolymer; and mixtures thereof.

8. The imaging medium of claim 1 or 2 wherein the first polymer(s) are selected from the group consisting of:

ethylene/vinyl carboxylic acid copolymers, each ethylene/vinyl carboxylic acid copolymer independently comprising about 80 to about 98 percent by weight ethylene and about 2 to about 20 weight percent vinyl carboxylic acid, based upon the total weight of the ethylene/vinyl carboxylic acid copolymer;

ethylene/vinyl acetate copolymers, each ethylene/vinyl acetate copolymer independently comprising about 60 to about 85 percent by weight ethylene and about 15 to about 40 weight percent vinyl acetate, based upon the total weight of the ethylene/vinyl acetate copolymer;

ethylene/vinyl acrylate copolymers, each ethylene/vinyl acrylate copolymer independently comprising about 70 to about 90 percent by weight ethylene and about 10 to about 30 weight percent vinyl acrylate, based upon the total weight of the ethylene/vinyl acrylate copolymer;

ethylene/vinyl carboxylic acid/vinyl acetate copolymers, each ethylene/vinyl carboxylic acid/vinyl acetate copolymer independently comprising about 48 to about 84 percent by weight ethylene, about 1 to about 12 weight percent vinyl carboxylic acid, and about 15 to about 40 percent by weight vinyl acetate based upon the total weight of the ethylene/vinyl carboxylic acid/vinyl acetate copolymer;

ethylene/vinyl carboxylic acid/vinyl acrylate copolymers, each ethylene/vinyl carboxylic acid/vinyl acrylate copolymer independently comprising about 52 to about 89 percent by weight ethylene, about 1 to about 12 weight percent vinyl carboxylic acid, and about 10 to about 30 percent by weight vinyl acrylate based upon the total weight of the ethylene/vinyl carboxylic acid/vinyl acrylate copolymer;

ethylene/anhydride/vinyl acetate copolymers, each ethylene/anhydride/vinyl acetate copolymer independently comprising about 42 to about 84.9 percent by weight ethylene, about 0.1 to about 12 weight percent anhydride, and about 15 to about 40 percent by weight vinyl acetate based upon the total weight of the ethylene/anhydride/vinyl acetate copolymer;

ethylene/anhydride/vinyl acrylate copolymers, each ethylene/anhydride/vinyl acrylate copolymer independently comprising about 52 to about 89.9 percent by weight ethylene, about 0.1 to about 12 weight percent anhydride, and about 10 to about 30 percent by weight vinyl acrylate based upon the total weight of the ethylene/anhydride/vinyl acrylate copolymer; and mixtures thereof.

9. The imaging medium of claim 1 or 2 wherein the first polymer(s) are selected from the group consisting of:

ethylene/vinyl carboxylic acid copolymers, each ethylene/vinyl carboxylic acid copolymer independently comprising about 85 to about 96 percent by weight ethylene and about 4 to about 15 weight percent vinyl carboxylic acid, based upon the total weight of the ethylene/vinyl carboxylic acid copolymer;

ethylene/vinyl acetate copolymers, each ethylene/vinyl acetate copolymer independently comprising about 65 to about 82 percent by weight ethylene and about 18 to about 35 weight percent vinyl acetate, based upon the total weight of the ethylene/vinyl acetate copolymer;

ethylene/vinyl acrylate copolymers, each ethylene/vinyl acrylate copolymer independently comprising about 75 to about 85 percent by weight ethylene and about 15 to about 25 weight percent vinyl acrylate, based upon the total weight of the ethylene/vinyl acrylate copolymer;

ethylene/vinyl carboxylic acid/vinyl acetate copolymers, each ethylene/vinyl carboxylic acid/vinyl acetate copolymer independently comprising about 55 to about 81 percent by weight ethylene, about 1 to about 10 weight percent vinyl carboxylic acid, and about 18 to about 35 percent by weight vinyl acetate based upon the total weight of the ethylene/vinyl carboxylic acid/vinyl acetate copolymer;

ethylene/vinyl carboxylic acid/vinyl acrylate copolymers, each ethylene/vinyl carboxylic acid/vinyl acrylate copolymer independently comprising about 65 to about 83 percent by weight ethylene, about 2 to about 10 weight percent vinyl carboxylic acid, and about 15 to about 25 percent by weight vinyl acrylate based upon the total weight of the ethylene/vinyl carboxylic acid/vinyl acrylate copolymer;

ethylene/anhydride/vinyl acetate copolymers, each ethylene/anhydride/vinyl acetate copolymer independently comprising about 55 to about 81.5 percent by weight ethylene, about 0.5 to about 10 weight percent anhydride, and about 18 to about 35 percent by weight vinyl acetate based upon the total weight of the ethylene/anhydride/vinyl acetate copolymer;

ethylene/anhydride/vinyl acrylate copolymers, each ethylene/anhydride/vinyl acrylate copolymer independently comprising about 65 to about 84 percent by weight ethylene, about 1 to about 10 weight percent anhydride, and about 15 to about 25 percent by weight vinyl acrylate based upon the total weight of the ethylene/anhydride/vinyl acrylate copolymer; and mixtures thereof.

10. The imaging medium of claim 1 wherein the receptor layer comprises a blend of about 10 to about 50 percent by weight first polymer(s) and about 50 to about 90 percent by weight of a second polymer(s), wherein the weight percentages are based upon the total weight of the receptor layer.

11. The imaging medium of claim 1 wherein the receptor layer comprises a blend of about 15 to about 35 percent by weight first polymer(s) and about 65 to about 85 percent by weight second polymer(s), based upon the total weight of the receptor layer.

12. The imaging medium of claim 1 or 2 wherein the vinyl carboxylic acid is selected from the group consisting of acrylic acid, methacrylic acid, and mixtures thereof.

13. The imaging medium of claim 1 wherein the receptor layer comprises a blend of the first polymer(s) in an amount of from about 18 to about 35% by weight and the second polymer(s) in an amount of from about 65 to about 82% by weight, based upon the total weight of the receptor layer.

14. The imaging medium of claim 1 or 2 wherein the first polymer(s) comprise methacrylic acid in an amount of at least about 1.0% by weight based upon the total weight of the first polymer(s).

15. The imaging medium of claim 1 or 2 wherein the first polymer(s) comprise an anhydride in an amount of at least about 0.1% by weight based upon the total weight of the first polymer(s).

16. The imaging medium of claim 1 or 2 wherein the first polymer(s) comprise methacrylic acid in an amount of at least about 2% by weight based upon the total weight of the first polymer(s).

17. The imaging medium of claim 1 or 2 wherein the first polymer(s) comprise the polymerization product of a composition comprising ethylene and an acid selected from the group consisting of methacrylic acid and acrylic acid, having a melt index of at least about 2.5 grams/10 minutes and an acid content of from about 2 to about 20% by weight based upon the total weight of the first polymer(s).

18. The imaging medium of claim 1 or 2 wherein the first polymer(s) comprise the polymerization product of a composition comprising ethylene and vinyl acetate, the first polymer(s) having a melt index of at least about 2.5 grams/10 minutes and a vinyl acetate content of from about 15 to about 40 percent by weight based upon the total weight of the first polymer(s).

19. The imaging medium of claim 1 or 2 wherein the first polymer(s) comprise the polymerization product of a composition comprising ethylene and vinyl acrylate, the first polymer(s) having a melt index of at least about 2.5 grams/10 minutes and an acrylate content of from about 10 to about 30 percent by weight based upon the total weight of the first polymer(s).

20. The imaging medium of claim 1 or 2 wherein the first polymer(s) comprise the polymerization product of a composition comprising ethylene, vinyl acrylate, and methacrylic acid, the first polymer(s) having a melt index of at least about 2.5 grams/10 minutes, wherein the vinyl acrylate content is about 10 to about 30 percent by weight and the acid content is about 1 to about 12 percent by weight based upon the total weight of the first polymer(s).

21. The imaging medium of claim 17 wherein the polymerization product has been neutralized with a metal cation thereby forming an ionomer, having a neutralized acid content of from about 2 to about 6% by weight and an acid content of no more than about 15% by weight based upon the total weight of the first polymer(s).

22. The imaging medium of claim 21 wherein the ionomer comprises a neutralized ethylene-co-methacrylic acid ionomer.

23. The imaging medium of claim 1 or 2 wherein the vinyl acrylate monomer is selected from the group consisting of vinyl alkyl acrylates, vinyl alkacrylates, and mixtures thereof.

24. The imaging medium of claim 1 or 2 wherein the vinyl acrylate monomer is selected from the group consisting of vinyl methyl acrylate, vinyl ethyl acrylate, vinyl propyl acrylate, vinyl n-butyl acrylate, vinyl n-pentyl acrylate, vinyl n-hexyl acrylate, vinyl methacrylate, vinyl ethacrylate, vinyl propacrylate, vinyl butacrylate, vinyl pentacrylate, vinyl hexacrylate, and mixtures thereof.

25. The imaging medium of claim 1 or 2 wherein the first polymer(s) comprise the polymerization product of a composition comprising ethylene, vinyl acetate, and methacrylic acid, the first polymer(s) having a melt index of at least about 2.5 grams/10 minutes, wherein the vinyl acetate content is about 15 to about 40 percent by weight and the acid content is about 1 to about 12 percent by weight based upon the total weight of the first polymer(s).

26. The imaging medium of claim 1 or 2 wherein the receptor layer has a thickness of about 0.0075 mm to about 0.25 mm.

27. The imaging medium of claim 1 or 2 wherein the receptor layer has a thickness of about 0.013 mm to about 0.13 mm.

28. The imaging medium of claim 2 wherein the first layer comprises at least about 75 percent by weight first polymer(s) based upon the total weight of the first layer and wherein the second layer comprises at least about 60 percent second polymer based on the total weight of the second layer.

29. The imaging medium of claim 1 or 2 wherein each second polymer independently comprises the polymerization product of a composition comprising (i) about 50 to about 88 percent by weight ethylene, (ii) about 10 to about 45 percent by weight of a monomer(s) selected from the group consisting of vinyl acetate, vinyl acrylate, and mixtures thereof, and (iii) about 2 to about 20 percent by weight carbon monoxide, wherein the weight percentages are based upon the total weight of the second polymer.

30. A method comprising the step of using the imaging medium of claim 1 or claim 2 in an electrophotographic printing process.

31. The method of claim 30 in which an image is formed from a composition comprising a plurality of thermoplastic toner particles in a liquid carrier at a first temperature, wherein the liquid carrier is not a solvent for the particles at the first temperature and wherein the thermoplastic particles and the liquid carrier form substantially a single phase at or above a second temperature.

32. The method of claim 31 wherein the thermoplastic toner particles are selected from the group consisting of ethylene vinyl acrylate copolymers, ethylene vinyl acetate copolymers, ethylene acrylic acid copolymers, ionomers of ethylene acrylic acid copolymers, and mixtures thereof.

33. The method of claim 30 which utilizes a dry thermoplastic toner.

34. The method of claim 33 wherein the toner is selected from the group consisting of polyester and styrene acrylate copolymer.

35. A method of transferring an electrophotographically developed image from a photoconductor to an imaging medium, comprising the steps of:
 (a) selectively providing desired portions of a photoconductor with a developed image, the image comprising a plurality of thermoplastic toner particles in a liquid carrier at a first temperature, wherein the liquid carrier is not a solvent for the particles at the first temperature and wherein the thermoplastic particles and the liquid carrier form substantially a single phase at or above a second temperature;
 (b) heating the developed image to a temperature at least as high as the second temperature to thereby form a single phase of the thermoplastic particles and liquid carrier; and
 (c) thereafter transferring the developed image to the receptor layer of an imaging medium at a temperature of about 120 to about 165° C.;
 wherein the imaging medium is that of claim 1 or 2.

36. The method of claim 35 wherein the thermoplastic toner particles are selected from the group consisting of ethylene vinyl acrylate copolymers, ethylene vinyl acetate copolymers, ethylene acrylic acid copolymers, ionomers of ethylene acrylic acid copolymers, and mixtures thereof.

37. A method of transferring an electrophotographically developed image from a photoconductor to an imaging medium comprising the steps of:
 (a) selectively providing desired portions of a photoconductor with a developed image, the image comprising a plurality of thermoplastic dry toner particles wherein the toner particles are solid at a first temperature, but which soften or melt at or above a second temperature;
 (b) transferring the developed image onto a receptor layer of an imaging medium, wherein the imaging medium is that of claim 1 or 2;
 (c) heating and optionally applying pressure to the developed image such that it reaches a temperature at least as high as the second temperature to soften or melt the toner particles to form a final fixed image.

38. The method of claim 37 wherein the toner is selected from the group consisting of polyester and styrene acrylate copolymer.

39. An imaged medium comprising:
(a) the imaging medium of claim 1 or 2;
(b) an image on a surface of the receptor layer, which surface is not bonded to the backing, wherein the image is formed from a composition comprising a plurality of thermoplastic toner particles in a liquid carrier at a first temperature, wherein the liquid carrier is not a solvent for the particles at the first temperature and wherein the thermoplastic particles and the liquid carrier form substantially a single phase at or above a second temperature.

40. The imaged medium of claim 39 wherein the thermoplastic toner particles are selected from the group consisting of ethylene vinyl acrylate copolymers, ethylene vinyl acetate copolymers, ethylene acrylic acid copolymers, ionomers of ethylene acrylic acid copolymers, and mixtures thereof.

41. An imaged medium comprising:
(a) the imaging medium of claim 1 or 2;
(b) an image on a surface of the receptor layer, which surface is not bonded to the backing, wherein the image is formed from a dry thermoplastic toner.

42. The imaged medium of claim 41 wherein the toner is selected form the group consisting of polyester and styrene acrylate copolymer.

43. The imaging medium of claim 1 or 2 wherein each second polymer independently comprises the polymerization product of a composition comprising (i) about 50 to about 77 percent by weight ethylene, (ii) about 18 to about 35 percent by weight of a monomer(s) selected from the group consisting of vinyl acetate, vinyl acrylate, and mixtures thereof, and (iii) about 5 to about 15 percent by weight carbon monoxide, wherein the weight percentages are based upon the total weight of the second polymer.

44. The imaged medium of claim 39 which further comprises a layer of adhesive coated over a surface of the backing opposite the receptor layer and a release liner attached to a surface of the adhesive layer opposite the backing.

45. The imaged medium of claim 39 which further comprises a layer of adhesive coated over the image and the surface of the receptor layer not bonded to the backing, wherein the receptor layer and the backing are selected such that the image can be viewed therethrough.

46. The imaged medium of claim 41 which further comprises a layer of adhesive coated over a surface of the backing opposite the receptor layer and a release liner attached to a surface of the adhesive layer opposite the backing.

47. The imaged medium of claim 41 which further comprises a layer of adhesive coated over the image and the surface of the receptor layer not bonded to the backing, wherein the receptor layer and the backing are selected such that the image can be viewed therethrough.

48. The imaging medium of claim 1 or 2, wherein the receptor layer further comprises:
about 0.05 to about 3 percent by weight of an ultraviolet light stabilizer selected from the group consisting of ultraviolet light absorbers, ultraviolet light inhibitors, and mixtures thereof, based upon the total weight of the receptor layer.

49. The imaging medium of claim 48 wherein the ultraviolet light absorbers are selected from the group consisting of benzotriazoles, benzophenones, oxalanilides, triazines, and mixtures thereof, and the ultraviolet light inhibitors are selected from the group consisting of hindered amines.

50. The imaging medium of claim 48 wherein both ultraviolet light absorber and ultraviolet light inhibitor are present in the receptor layer at a weight ratio of ultraviolet light absorber to ultraviolet light inhibitor of about 1:3 to about 3:1.

51. The imaging medium of claim 48 wherein both ultraviolet light absorber and ultraviolet light inhibitor are present in the receptor layer at a weight ratio of ultraviolet light absorber to ultraviolet light inhibitor of about 1.5:2.5 to about 2.5:1.5.

52. The imaging medium of claim 48 wherein the receptor layer further comprises about 0.1 to about 3 percent by weight of a component selected from the group consisting of ultraviolet light absorber, ultraviolet light inhibitor, and mixtures thereof, based on the total weight of the receptor layer.

53. The imaging medium of claim 48 wherein the receptor layer further comprises about 0.3 to about 1.5 percent by weight of a component selected from the group consisting of ultraviolet light absorber, ultraviolet light inhibitor, and mixtures thereof, based on the total weight of the receptor layer.

54. The imaging medium of claim 48 wherein the receptor layer further comprises about 0.5 to about 1 percent by weight of a component selected from the group consisting of ultraviolet light absorber, ultraviolet light inhibitor, and mixtures thereof, based on the total weight of the receptor layer.

* * * * *